US007253376B2

(12) United States Patent
Zhang et al.

(10) Patent No.: US 7,253,376 B2
(45) Date of Patent: Aug. 7, 2007

(54) METHODS AND APPARATUS FOR TRUNCATING AN IMAGE FORMED WITH COHERENT RADIATION

(75) Inventors: Shiyu Zhang, Hayward, CA (US); Igor Landau, Palo Alto, CA (US); Arnold Lungershausen, Fremont, CA (US); David A. Markle, Saratoga, CA (US); Casey Donaher, Westford, MA (US)

(73) Assignee: Ultratech, Inc., San Jose, CA (US)

( * ) Notice: Subject to any disclaimer, the term of this patent is extended or adjusted under 35 U.S.C. 154(b) by 141 days.

(21) Appl. No.: 11/040,739

(22) Filed: Jan. 21, 2005

(65) Prior Publication Data

US 2006/0163223 A1 Jul. 27, 2006

(51) Int. Cl.
*B23K 26/06* (2006.01)
(52) U.S. Cl. .......................... 219/121.73; 219/121.65; 219/121.66; 219/121.74
(58) Field of Classification Search ........... 219/121.73, 219/121.74, 121.75, 121.65, 121.66
See application file for complete search history.

(56) References Cited

U.S. PATENT DOCUMENTS

| 4,469,407 | A | * | 9/1984 | Cowan et al. ............... 359/888 |
| 5,571,429 | A | * | 11/1996 | Smith et al. ............ 219/121.73 |
| 5,721,416 | A | * | 2/1998 | Burghardt et al. ...... 219/121.73 |
| 5,859,424 | A | * | 1/1999 | Norton et al. ............... 359/888 |
| 6,531,681 | B1 | * | 3/2003 | Markle et al. .......... 219/121.73 |
| 6,747,245 | B2 | | 6/2004 | Talwar et al. ............. 219/121.8 |
| 2004/0036864 | A1 | * | 2/2004 | Zhao et al. ............... 356/237.2 |
| 2005/0070035 | A1 | * | 3/2005 | Yazaki et al. ................. 438/22 |
| 2006/0102602 | A1 | * | 5/2006 | Dane et al. ............ 219/121.73 |

FOREIGN PATENT DOCUMENTS

JP 63-56383 A * 3/1988

OTHER PUBLICATIONS

"Relay Imaging in Rod Amplifier Systems," Positive Light, Inc., May 2002.
T. Araki, T. Asakura, "Coherent Apodization Problems," pp. 78-82, Reprinted from Optics Communications, vol. 20(3), pp. 373-377, 1977.

(Continued)

*Primary Examiner*—Geoffrey S. Evans
(74) *Attorney, Agent, or Firm*—Allston L. Jones

(57) ABSTRACT

Methods and apparatus for truncating an image formed with coherent radiation. The optical relay system is adapted to form a line image at the image plane. The image is truncated by a variable aperture at or near the aperture plane conjugate to the image plane, to block progressively increasing portions of an incident coherent radiation beam used to form the line image. An apodizing pupil filter having a maximum transmission or reflection in the center and a transmission or reflection profile that varies with direction corresponding to long direction of the line image is provided in the pupil plane. The apodization is designed to prevent hot-spots from forming in the truncated image and ensures a relatively smooth, flat intensity profile. Thus, one end or another of a coherent line image scanned over a substrate can be truncated during scanning without substantially changing the image intensity extending into the product area.

43 Claims, 17 Drawing Sheets

OTHER PUBLICATIONS

F. G. Leaver, R. W. Smith, "The Use of Apodization in Coherent Imaging Systems," pp. 41-44, Reprinted from Optik, vol. 39(2), pp. 156-160, 1973.

L. S. Gruber, B. J. Thompson, "On the Apodization ofCoherent Imaging Systems," pp. 45-48, Reprinted from Optical Engineering, vol. 13(5), pp. 451-454, 1974.

* cited by examiner

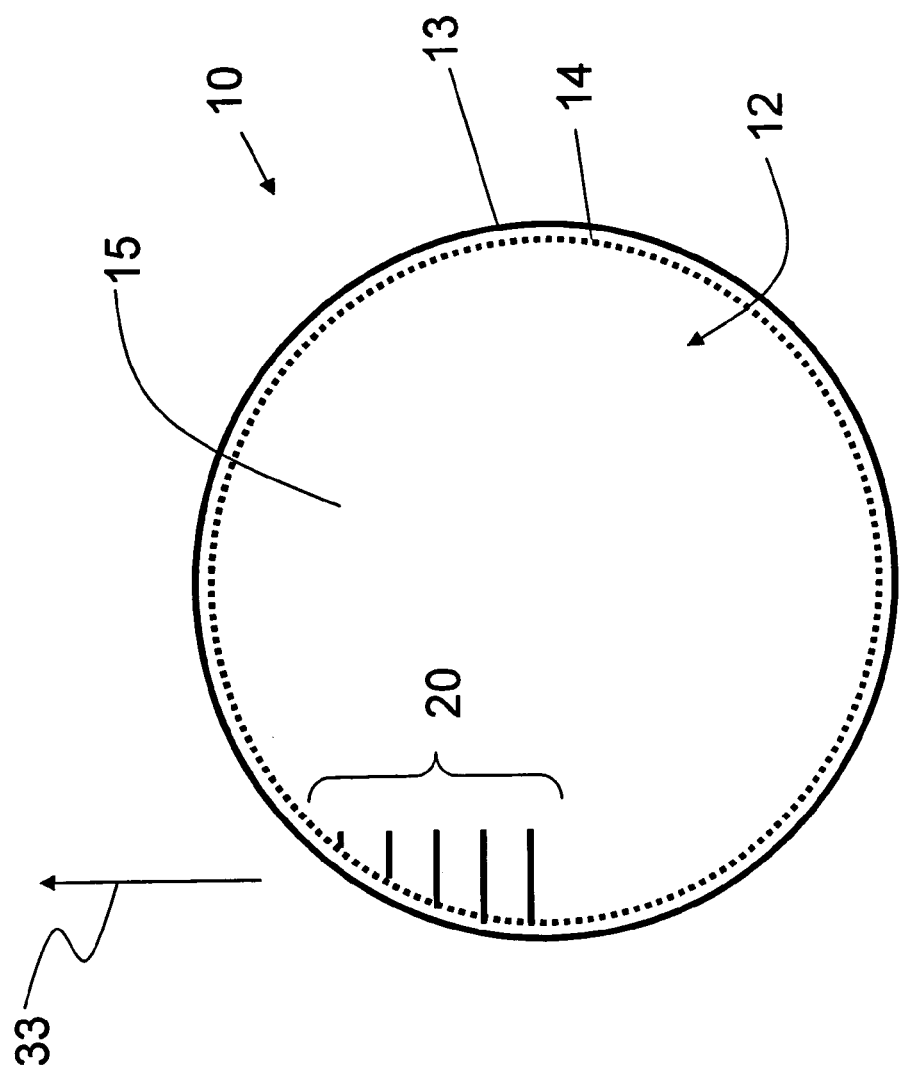

METHODS AND APPARATUS FOR TRUNCATING AN IMAGE FORMED WITH COHERENT RADIATION

CROSS-REFERENCE TO RELATED APPLICATIONS

The present invention is related to the following patents and patent applications: U.S. Pat. No. 6,747,245, entitled "Laser Scanning Apparatus and Method for Thermal Processing"; U.S. patent application Ser. No. 10/787,664 entitled "Laser Scanning Apparatus and Methods for Thermal Processing" filed on Feb. 26, 2004; U.S. patent application Ser. No. 10/806,014, entitled "Laser Scanning Apparatus and Methods for Thermal Processing" filed on Mar. 22, 2004; U.S. patent application Ser. No. 10/674,106 entitled "Method of Annealing Undoped Silicon Substrates" filed on Sep. 29, 2003; and to U.S. patent application Ser. No. 10/762,861 entitled "Laser Thermal Annealing of Lightly Doped Silicon Substrates" filed on Jan. 22, 2004; all of which are assigned to the present Assignee Ultratech, Inc. of San Jose, Calif., and all of which are incorporated by reference herein.

BACKGROUND OF THE INVENTION

1. Field of the Invention

The present invention relates to systems and methods that form images from coherent laser radiation, and in particular relates to systems and methods for truncating such images without a substantial modification in intensity of the truncated image due to diffraction. The invention has industrial utility in a number of fields, including laser thermal annealing (LTA) (also referred to as "laser thermal processing" or "LTP") used in semiconductor device manufacturing.

2. Description of the Prior Art

LTA involves irradiating a semiconductor substrate ("wafer") with a scanned beam of radiation that rapidly brings the substrate surface temperature from a relatively low temperature (e.g., 400° C.) to a relatively high temperature (e.g., 1,300° C.) in order to activate dopants in the substrate. Only the material very close to the top surface of the substrate is heated to the relatively high temperature during the dwell time of the scan. Thus the top surface is cooled by the low temperature in the bulk of the substrate almost as quickly as it was heated. Typically, LTA systems produce such a thermal cycle in a time span of a few milliseconds or less. To effectively anneal the entire surface of a substrate, the peak irradiation seen at each point on the substrate must be relatively uniform, e.g., within +/−1%. Further, the irradiation must be performed in a manner that keeps thermal stresses in the substrate below levels that could lead to breakage or slip within the crystal structure.

The "Detailed Description of the Invention" section includes a "Definitions" section that defines many of the terms used hereinbelow. FIG. 1 is a schematic plan view of a wafer 10 undergoing LTA, and FIG. 2 is a cross-sectional view of FIG. 1 taken along the line 2-2. Wafer 10 has an upper surface 12 and an outer edge 13. Upper surface 12 is typically divided into two zones: a thin, annular (e.g., 3 mm) edge exclusion zone 14 surrounding a central product zone 15 wherein the semiconductor devices are formed. In exclusion zone 14, no product, or product that zone would yield, is expected.

In LTA, a narrow image 20 (e.g., a line image) is formed by a LTP laser beam 26. LTP laser beam 26 is formed, for example, by a radiation source 28 (e.g., a $CO_2$ laser) generating a coherent radiation beam 29 and passing the radiation beam through an optical system 32 that includes an optical relay (not shown). Image 20 scans back and forth across wafer surface 12 in the direction illustrated by the two arrows 3 and 4, e.g., by moving the wafer relative to the line image. LTP laser beam 26 is preferably incident on wafer surface 12 at an incidence angle $\theta_I$ relative to surface normal N (FIG. 2), and more preferably is incident at or near Brewster's angle, which is about 75° for a silicon wafer and infra-red radiation at a wavelength of 10.6 microns. Due to of the incident angle $\theta_I$ of laser beam 26, in the area close to position A the laser beam strikes the thin vertical edge 13 of the wafer as the beam transitions across the edge. In this case, energy is absorbed both through wafer top-surface 12 and through wafer edge 13, which drastically increases the temperature and the thermally induced stress in this area. Once the thermal stress exceeds the wafer's elastic limits, breakage occurs.

With reference to FIG. 1, when the center position O on the wafer is irradiated by laser beam 26, the intense heat generated at this center position dissipates in five directions, forward and backwards in the scan path as well as to both sides of the scan path, as well as down into the body of the wafer. This minimizes thermal gradients and stress levels so that breakage tends not to occur when the beam is in the central area. However, at or near the wafer edge locations near position A, if the scanning velocity of image 20 is low enough, and if the annealing temperature is high enough, wafer breakage can occur. In this case, the region near the edge is heated both through the wafer upper surface 12 and through the wafer edge 13, which exacerbates the temperatures and stress in the vicinity of the edge. A second type of wafer edge breakage occurs at the ends of the scan path near points B and C. Breakage occurs here because as the heat dissipation path forward of the scanned beam grows shorter as the edge is approached the heat is concentrated into an increasingly smaller area near the edge which results in the build-up of a significant amount of heat at the wafer's edge. This type of breakage can also occur at or near the wafer edge between A and B and A and C.

An even worse mechanism for breakage occurs to heat being applied through the edge of the wafer. Given the shallow angle of the beam on the wafer (typically 15 degrees from horizontal) causes the beam intensity to be nearly four times higher on the wafer edge than it is on the top surface of the wafer. Since the beam can not strike the edge of the wafer facing away from the direction of incidence, this breakage mode only occurs on half the wafer, i.e., the half on which the beam strikes the edge.

FIG. 3 illustrates one apparently straightforward way to attempt to solve the wafer breakage issues described above. FIG. 3 is a cross-sectional view of wafer 12 similar to that of FIG. 2, with the addition of an elevated skirt 50 that surrounds the substrate edge. Elevated skirt 50 includes an upper surface 52, a lower surface 53, and a central aperture 54 defined by an inner edge 55. Skirt 50 is supported in a plane above wafer surface 12, with inner edge 55 arranged near wafer outer edge 13. Elevated skirt 50 is arranged so that the obliquely incident LTP laser beam 26 is prevented from irradiating wafer edge 13 by first encountering skirt upper surface 52. This approach at first glance would appear to solve the wafer edge breakage problem.

Unfortunately, the elevated skirt approach introduces two important adverse effects that make it an untenable solution. First, when skirt inside edge 55 is introduced in the path of coherent laser beam 26, diffraction occurs, as indicated schematically by diffracted wavefronts 57. For the laser wavelengths typically associated with LTA (e.g., 10.6 microns from a $CO_2$ laser), the diffraction effect is quite apparent for distances between the skirt and the wafer of 0.2 mm or more. This diffraction of coherent radiation introduces non-uniformities into the unobstructed portion of the laser beam. These non-uniformities create a non-uniform image 20, which results in non-uniform annealing of the wafer near the wafer edge 13.

In product zone 15, adjacent scans 3 and 4 are butted together so that the maximum variation in the peak intensity seen by any point in the product zone is between the maximum intensity and an intensity threshold value $I_{TH}$. The threshold value $I_{TH}$ depends on the nature of the process and can be, for example in a critical application, 99% of the maximum intensity or, in a less critical application, about 96% of the maximum intensity.

Computer modeling of the diffraction effect indicates that skirt inside edge 55 needs to be closer than 0.1 mm to wafer surface 12 in order to keep the illumination non-uniformity within acceptable limits. However, such close placement is unfeasible in practice. In addition, on side 60 of wafer 10, radiation 62 is reflected from wafer surface 12 and bounces between the wafer surface and the lower surface 53 of the skirt. In addition, the beam reflected from the edge of the skirt is directed back onto the substrate where it interferes with the directly incident beam. These effects pose additional wafer heating problems, which adversely affect the LTP process.

Accordingly, a more effective way of truncating a scanned coherent radiation beam near the edges of the substrate is needed so that the resultant truncated image does not adversely affect the LTP process uniformity or break the substrate.

SUMMARY OF THE INVENTION

The present invention includes systems and methods for truncating a scanned coherent radiation beam that forms an image on a substrate as the image approaches the substrate edge or the edge exclusion zone. Truncation is carried out in a manner that does not result in a substantial change in the uniformity of the remaining part of the image (the "truncated image"). In an example embodiment, the truncated images have a maximum intensity equal to or less than that of the untruncated image. However, it is possible to compensate for small changes in the maximum intensity value provided that the small changes are predictable. An important aspect of the invention is that the truncation does not add spikes ("hot spots") or high-frequency ripples to the top of the resulting image intensity profile formed by the beam. The systems and methods of the present invention have industrial applicability in the field of LTP of semiconductor wafers, and in particular to preventing wafer-edge breakage while maintaining processing uniformity during LTP.

Accordingly, a first aspect of the invention is an optical apparatus for truncating an image formed with coherent radiation. The apparatus includes an afocal optical relay system having an image plane, a pupil plane, and an aperture plane conjugate to the image plane. The afocal optical relay system is adapted to receive an incident beam of coherent radiation and form therefrom an untruncated image having a maximum intensity. The apparatus also includes an apodizing pupil filter arranged at the pupil plane, and a variable aperture arranged in the aperture plane. The variable aperture is adapted to truncate the incident radiation beam in order to form a truncated image at the image plane. The apodizing pupil filter acts to reduce diffraction from the aperture during truncation of the incident radiation beam that consequently forms a truncated image, so that the truncated image remains substantially uniform with a maximum intensity approximately equal to the untruncated image maximum intensity.

A second aspect of the invention is an optical apparatus for truncating an image scanned over a substrate that has an upper surface that includes a product zone surrounded by an edge exclusion zone. The apparatus includes an afocal optical relay system adapted to image an aperture plane conjugate with the substrate surface. The aperture plane includes a variable aperture adapted to selectively block some or all of the input beam so as to truncate the image as the scanned image transitions from the product zone to the exclusion zone or remove the truncation as the image transitions from the exclusion zone to the product zone. The relay further includes an apodizing pupil filter arranged at a pupil plane of the optical system. The apodizing pupil filter is adapted to reduce diffraction effects created at the aperture during image truncation so that the untruncated portion of the image in the product zone is uniform.

In the case where the apodizing pupil filter is transmissive, the filter preferably has an apodization with a central maximum transmission bordered on opposing sides by a smoothly increasing attenuation portion, e.g., as defined by a Gaussian function. In the case where the apodizing pupil filter is reflective, the filter preferably has an apodization with a central maximum reflectivity bordered on opposing sides by a smoothly decreasing reflectivity.

The optical relay system also contains an imaging optical system that accepts the collimated radiation from the afocal relay and forms a narrow line image on the substrate. Thus the afocal relay and the imaging optical systems share a common image plane at the substrate.

A third aspect of the invention is a method of spatially filtering an image formed at an image plane of an optical relay system having a pupil plane. The method includes blocking or truncating a portion of the coherent radiation upstream of the pupil plane at the aperture plane, and forming a uniform truncated image at the substrate plane. This is achieved by apodizing the relay pupil plane to reduce diffraction effects caused by blocking a portion of the upstream radiation beam.

A fourth aspect of the invention is a method of performing laser thermal annealing of a substrate, such as a semiconductor wafer. The substrate has an outer edge and an upper surface. The upper surface includes a product zone surrounded by an edge exclusion zone adjacent the edge of the substrate. The method includes forming, from a beam of coherent radiation, a uniform line image at an image plane coincident with the substrate upper surface. The method also includes scanning the line image over the substrate upper surface, and truncating the portion of the line image that falls into the exclusion zone. Truncation is done in such a manner that the untruncated portion of the line image in the product zone remains uniform. A substrate with a curved edge requires that the amount of truncation vary in synchronism with the scan position.

BRIEF DESCRIPTION OF THE DRAWINGS

FIG. 17 is a plan view of a substrate showing the upper surface with the product zone and the exclusion zone, and illustrating how a scanned line image is progressively truncated as the image is scanned over the wafer surface near the wafer edge so that the line image is maintained uniform in the product zone while being truncated in the exclusion zone.

Figure 1:
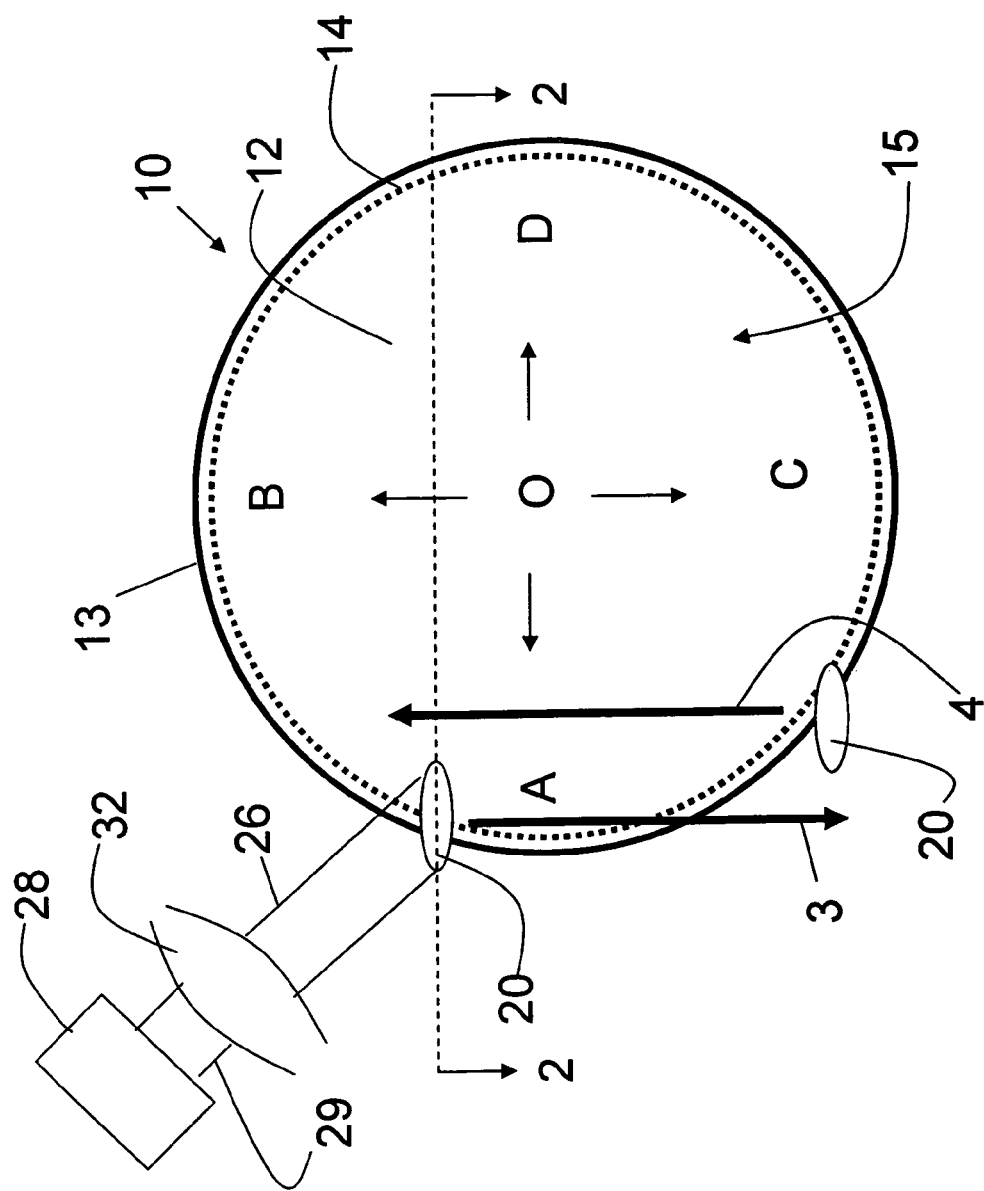
FIG. 1 is a plan view of a substrate in the form of a wafer being irradiated by a laser beam as part of the laser thermal processing (LTP) process.

The various elements depicted in the drawings are merely representational and are not necessarily drawn to scale. Certain proportions thereof may be exaggerated, while others may be minimized. The drawings are intended to illustrate various implementations of the invention, which can be understood and appropriately carried out by those of ordinary skill in the art.

DETAILED DESCRIPTION OF THE INVENTION

Definitions

In the description below and in the appended claims, the following definitions apply:

A "line image" is an image having one dimension significantly greater than that in the orthogonal dimension, so that the image is long in one dimension and narrow in the other.

An "intensity profile" is the spatial distribution of intensity created at an image plane integrated across the narrow direction of the image and measured as a function of the long direction.

An "intensity maximum" is the peak intensity value of the intensity profile.

The "useful portion of an image" is the contiguous portion of the intensity profile above a select intensity threshold $I_{TH}$, and is synonymous with "image".

The "image intensity" is the intensity of that portion of the intensity profile that is above the select intensity threshold $I_{TH}$.

A "uniform intensity profile" is an intensity profile that crosses the threshold value $I_{TH}$ at only two points, and is shorthand for "uniform image intensity".

The "useful image length" is the distance between the two threshold-value crossing points, assuming that the intensity profile is uniform and crosses the threshold value only twice. Thus, by way of example, for a threshold value $I_{TH}$ of 99% of the maximum intensity, the uniformity of the intensity is said to be 1%, or alternatively, +/−0.5%.

A "truncated image" is the part of an image that remains when a portion of the beam forming the image is blocked at the aperture plane.

The "degree of image uniformity" is defined as the maximum variation in the image intensity.

Anamorphic Afocal Optical Relay System

Figure 4:
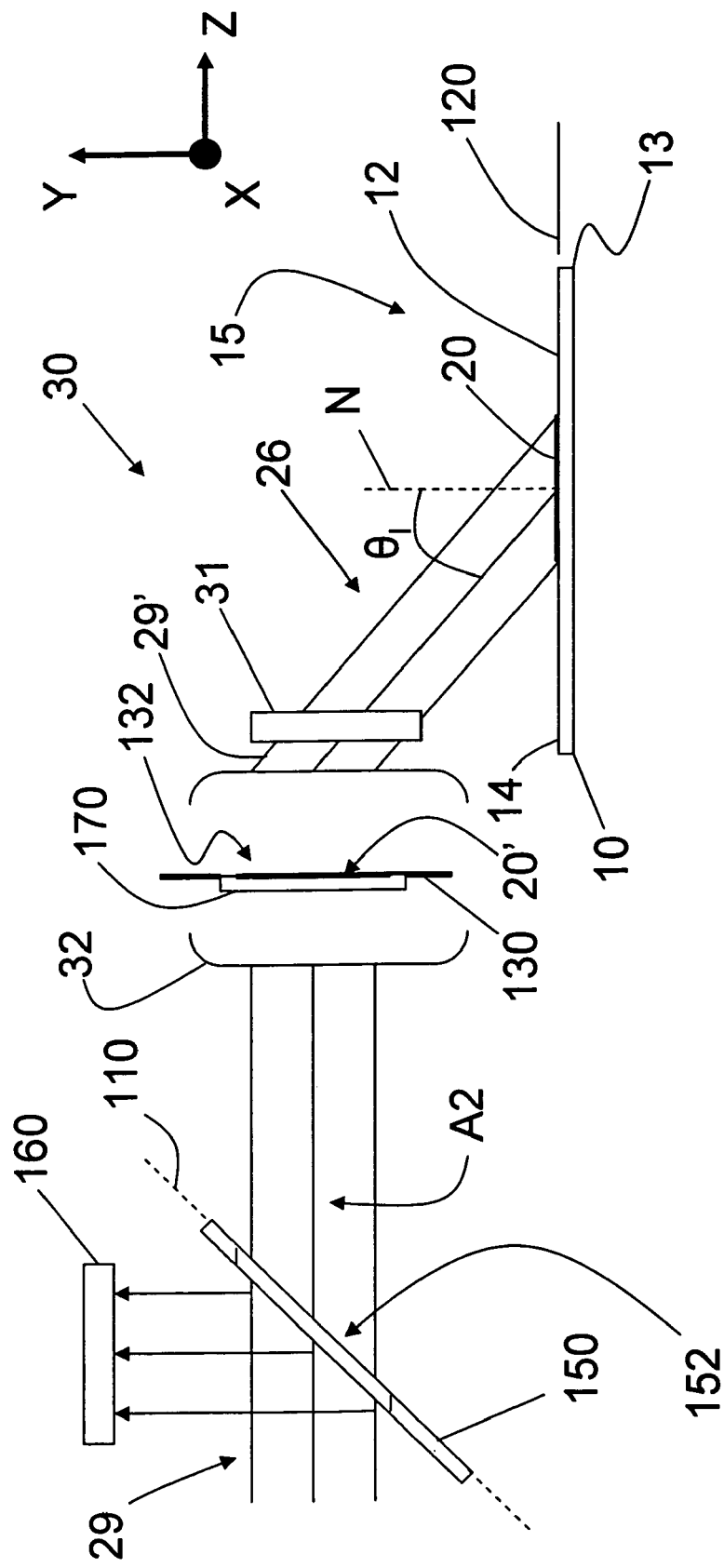
FIG. 4 is a schematic optical diagram of a generalized afocal optical relay system illustrating the aperture plane and variable aperture arranged therein, the pupil plane with an apodizing pupil filter arranged therein, and the image plane at the substrate surface, which is conjugate to the aperture plane.

FIG. 4 is a schematic optical diagram of a generalized optical relay system 30 that in an example embodiment includes an anamorphic afocal optical relay 32 and an imaging optical system 31. Optical relay system 30 has an aperture plane 110 conjugate to an image plane 120. Optical relay system 30 further includes a Fourier or pupil plane 130 having a pupil aperture ("pupil") 132. Afocal optical relay 32 can be either isotropic or anisotropic. The isotropic version has power in both the X and Y directions so that the collimated input beam is brought to a point-like focus in the pupil plane. This approach severely concentrates the energy onto a very small pupil area, making a pupil filter problematic. The anisotropic version, on the other hand, has no power in the X-direction so that the collimated input beam is brought to a line focus extending in the X-direction in the pupil plane, thus reducing energy concentration in the pupil plane. The output from afocal relay is also a collimated beam. In an example embodiment, imaging optical system 31 has power in the X-direction and thus forms image 20 as a line image extending in the Z-direction.

Afocal optical relay 32 is adapted to receive a collimated, coherent input radiation beam 29, such as a laser beam, and create therefrom a collimated output beam 29'. Collimated output beam 29' is received by imaging optical system 31, which creates LTP laser beam 26. LTP laser beam 26 forms image 20 at an image plane 120. In a preferred example embodiment, image 20 is a line image. In the discussion below, this preferred embodiment is considered for the sake of discussion.

A variable aperture 150, discussed below, is arranged in aperture plane 110, which is conjugate to image plane 120. Variable aperture 150 is centered on an axis A2 and has a central opening 152 positioned to transmit input radiation beam 29 when the aperture is "open", with the size and position being variable to partially or substantially block the transmission of input radiation beam 29. Aperture plane 110 is tilted when its conjugate plane, the image plane, is tilted. This tilted geometry typically occurs when optical system 30 is used for LTP, and LTP laser beam 26 is incident the substrate at a non-normal incidence, as is generally preferred. A beam dump 160 is arranged adjacent variable aperture 150 to capture (e.g., absorb) the portion of input radiation beam 29 reflected from variable aperture 150. Optical relay system 30 also includes an apodizing pupil filter 170 arranged in pupil plane 130 to mitigate diffraction effects in order to achieve a uniform image intensity profile. Apodizing pupil filter 170 is discussed in greater detail below.

Figure 5:
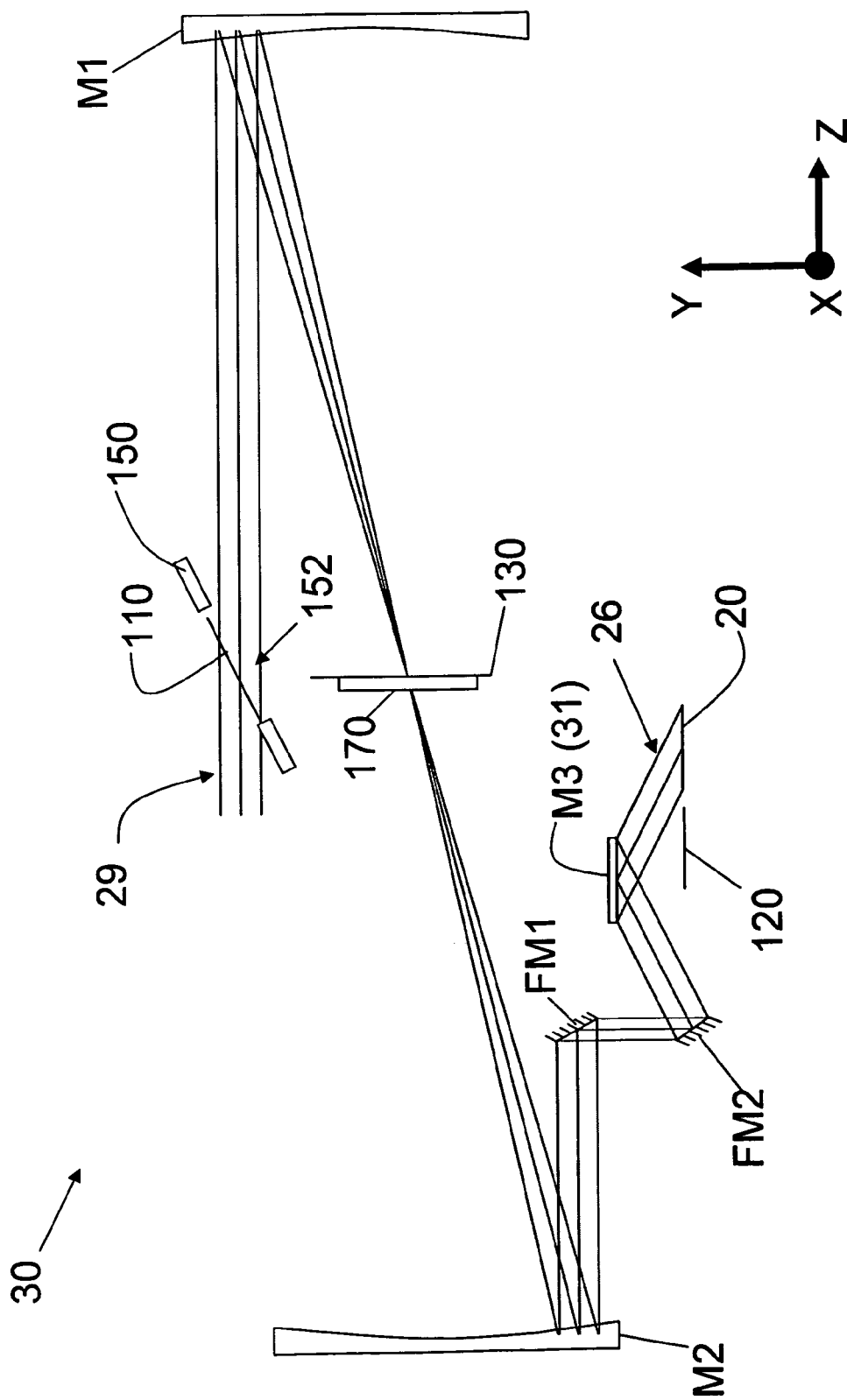
FIG. 5 is a specific example embodiment of the relay optical system of FIG. 4, wherein the afocal relay system is a two-mirror design with the pupil midway between the two mirrors and the imaging optical system is a cylindrical mirror.
Figure 6:
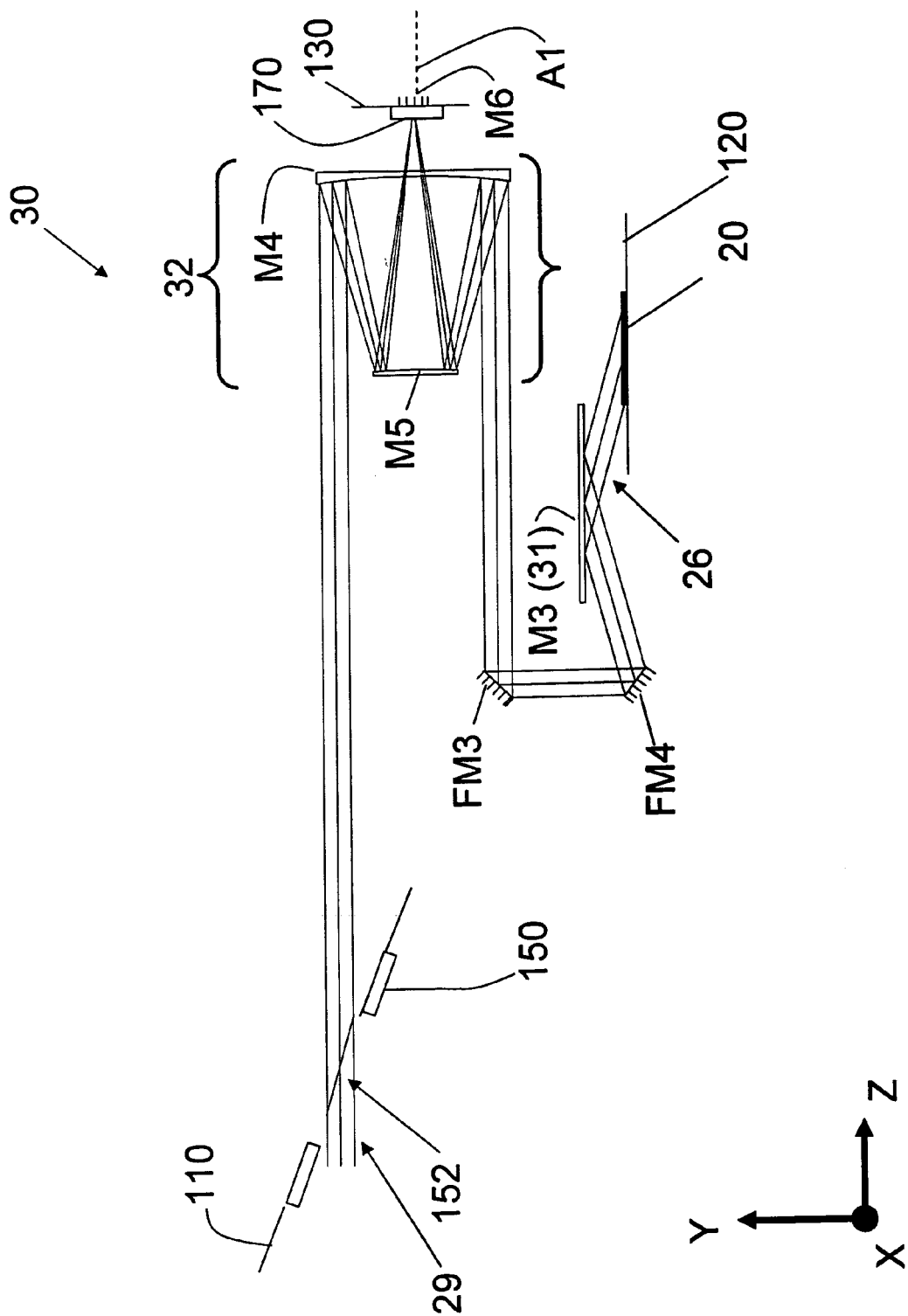
FIG. 6 is another specific example embodiment of a three-mirror, five-reflection design for the generalized afocal optical system of FIG. 4.

In performing LTP of substrate 10 using optical relay system 30, substrate surface 12 is arranged at or near image plane 120. Image plane 120 coincides with the image planes of afocal optical relay 30 and imaging optical system 31. In an example embodiment, optical system 31 is a cylindrical mirror, such as shown in FIGS. 5 and 6, discussed below.

With continuing reference to FIG. 4, a preferred embodiment of optical relay system 30 has no power in the direction perpendicular to the plane of the paper, i.e., in the X-direction, so it has no influence on the width of a narrow image 20 formed on the substrate. However, imaging system 31 has power in the plane of the paper, i.e., in the X-direction and thus determines the energy distribution along the width of the narrow image. In an example embodiment, optical relay system 30 is adapted to anamorphically relay the image of variable aperture 150 onto image plane 120.

In principle, reflective and/or refractive optical components can be employed to form optical relay system 30. Two all-reflective designs are illustrated in the example embodiments discussed below in connection with FIGS. 5 and 6. An all-reflective design is preferred because the high power level of incident radiation beam 29 causes considerable heating and associated refractive index changes in refractive elements. A refractive design can be derived from a reflective design by replacing each mirror surface of a reflective system with a refractive lens of equivalent power and unfolding the optical path.

With reference again to FIG. 4, one of the properties of anamorphic optical relay system 30 is that diffraction from the edges of aperture 150 affects the distribution of energy in the Y-direction at pupil plane 130. In an example embodiment, input radiation beam 29 has a Gaussian intensity profile and, after passing through a fixed aperture at aperture plane 110, provides approximately 1100 to 1300 watts of energy to pupil plane 130. At the pupil this power is distributed over an area with the FWHM length of 2.1 to 2.4 mm (Y-direction) and FWHM width (X-direction) of 14.3 mm. Thus, in an example embodiment, apodizing pupil filter 170 is reflective and is made of or includes molybdenum, and is preferably water-cooled.

In an example embodiment, apodizing pupil filter 170 is reflective, with a reflectivity that varies in the Y-direction so that it affects the energy distribution (intensity profile) along the length of line image 20. In an example embodiment, the reflectivity variation in the X-direction is constant out to the edge of the pupil 132 where the beam intensity is small, e.g., 0.04% or less of the maximum intensity.

With continuing reference to FIG. 4, as variable aperture 150 is closed, or shifted off-axis, the length of line-image 20 formed at image plane 120 is reduced. In an example embodiment, a reduction in the size of variable aperture 150 produces a roughly proportional decrease in the length of line image 20 until it disappears when opening 152 is completely closed.

As discussed in greater detail below, variable aperture 150 includes a fixed portion that removes some of the outer portion of input radiation beam 29 (e.g., the Gaussian wings) and a moveable portion (e.g., blades) that defines a variable opening normally centered on the fixed aperture. When the center of the substrate surface 12 is exposed with LTP beam 26, the moveable portion of the aperture plays no role. When the substrate edge 13 is approached by LTP beam 26, the moveable portion of the aperture shifts off-axis so as to vignette the side of image 20 that would otherwise fall on the wafer edge 13. The moveable aperture need not attenuate the intensity reaching the substrate edge completely, however it preferably reduces the beam intensity to the point where edge exposure is unlikely to result in fracture of the substrate.

Shifting the lateral position of opening 152 of variable aperture 150 obscures one side of input radiation beam 29, resulting in a shorter, displaced line image 20 from the original untruncated line image. Coordinating the variable aperture position with the position of LTP laser beam 26 on the substrate during scanning allows the portion of the input beam to be blocked that would otherwise strike edge 13 of substrate 10. However, the blocking must be done in such a manner that the uniformity of the beam irradiating the product zone and used for annealing is not significantly affected. As discussed below, optical relay system 30 is adapted to progressively reduce the length of the line image 20 without significantly altering its uniformity. This result is achieved, in an example embodiment, by the use of a smoothly varying pupil apodization, as discussed in greater detail below.

As discussed above, the typical substrate for semiconductor manufacturing is a silicon wafer. Such a wafer typically includes edge exclusion zone 14 surrounding product zone 15. Exclusion zone 14 provides a convenient area where the LTP laser beam 26 can transition from full intensity in product zone 15 to near zero intensity at the substrate edge 13. In an example embodiment, during LTA line image 20 is scanned over substrate 10 and is truncated at or within the exclusion zone. This is done so that edge 13 (FIG. 1) is not irradiated at full intensity, and so that the portion of the truncated line image that is within product zone 15 remains uniform.

Two-Mirror Example Embodiment

FIG. 5 is an example embodiment of anamorphic, afocal optical relay system 30 that includes two opposing concave mirrors M1 and M2 with pupil plane 130 in between. Mirrors M1 and M2 constitute the afocal relay system 30 of FIG. 4. Pupil 132 is transmissive so that a transmissive apodizing pupil filter 170 is used. Optical relay system 30 of FIG. 5 also includes two plane fold mirrors FM1 and FM2 arranged to receive collimated radiation from a lower portion of concave mirror M2 and direct the collimated radiation to an image-forming mirror M3.

Mirror M3 is adapted to receive collimated light and form therefrom a narrow line image 20 at image plane 120. This mirror constitutes the imaging optical system 31 of FIG. 4. In the preferred embodiment, mirror M3 is a cylindrical mirror aligned with the cylinder axis parallel to image plane 120 and in the plane of the drawing. The concave curvature focuses the incident laser beam to a narrow image at image plane 120 and thus onto substrate surface 12 positioned therein or thereabout. The distance from line image 20 to line-generating mirror M3 is approximately half of the radius of curvature of mirror M3.

In theory, afocal relay mirrors M1 and M2 can be either rotationally symmetric with respect to the optical system axis or unsymmetrical or anisotropic with respect to the system axis; i.e. having different curvatures in the X and Y directions assuming the optical axis is the Z-direction. The preferred embodiment is an anisotropic system having no power in the X-direction, so that the dimension of the beam measured in the X-direction is not influenced by the afocal relay.

Appendix A sets forth a prescription of an example of the two-mirror version of optical relay system 30 of FIG. 5.

Four-Mirror Example Embodiment

FIG. 6 is an example embodiment of four-mirror afocal anamorphic optical relay system 32, which is more compact and can provide better performance than the two-mirror version of FIG. 5. The four-mirror design allows the use of a flat, reflective apodizing pupil filter 170 at pupil plane 130.

The optical relay system 30 of FIG. 6 provides concave mirror M4 with collimated radiation beam 29. Mirror M4 is optically aligned with axis A1, and the collimated incoming beam is parallel to and above axis A1. The radiation beam is made to converge after striking an upper portion of mirror M4 and then is incident on an upper portion of relay mirror M5 also arranged along axis A1.

Relay mirror M5 directs the radiation back through an axial aperture (not shown) in mirror M4 to a mirror M6 located behind mirror M4. Mirror M6 is basically a reflective pupil apodizer. The radiation reflects from mirror M6 and travels back to mirror M5, from which it reflects off to relay mirror M4 on a portion of the mirror below axis A1. Mirrors M4, M5 and M6 constitute afocal optical relay 32 of FIG. 4. The radiation leaving the lower portion of mirror M4 is collimated and is folded by two fold mirrors FM3-FM4 so that collimated light is incident line-forming mirror M3 arranged parallel to image plane 120. Cylindrical image forming mirror M3 (which serves as imaging optical system 31 as shown in FIG. 4) then forms line image 20 at image plane 120.

Appendix B sets forth a prescription of an example of the three-mirror, five-reflection version of optical relay system 30 of FIG. 4.

Variable Aperture

Figure 7:
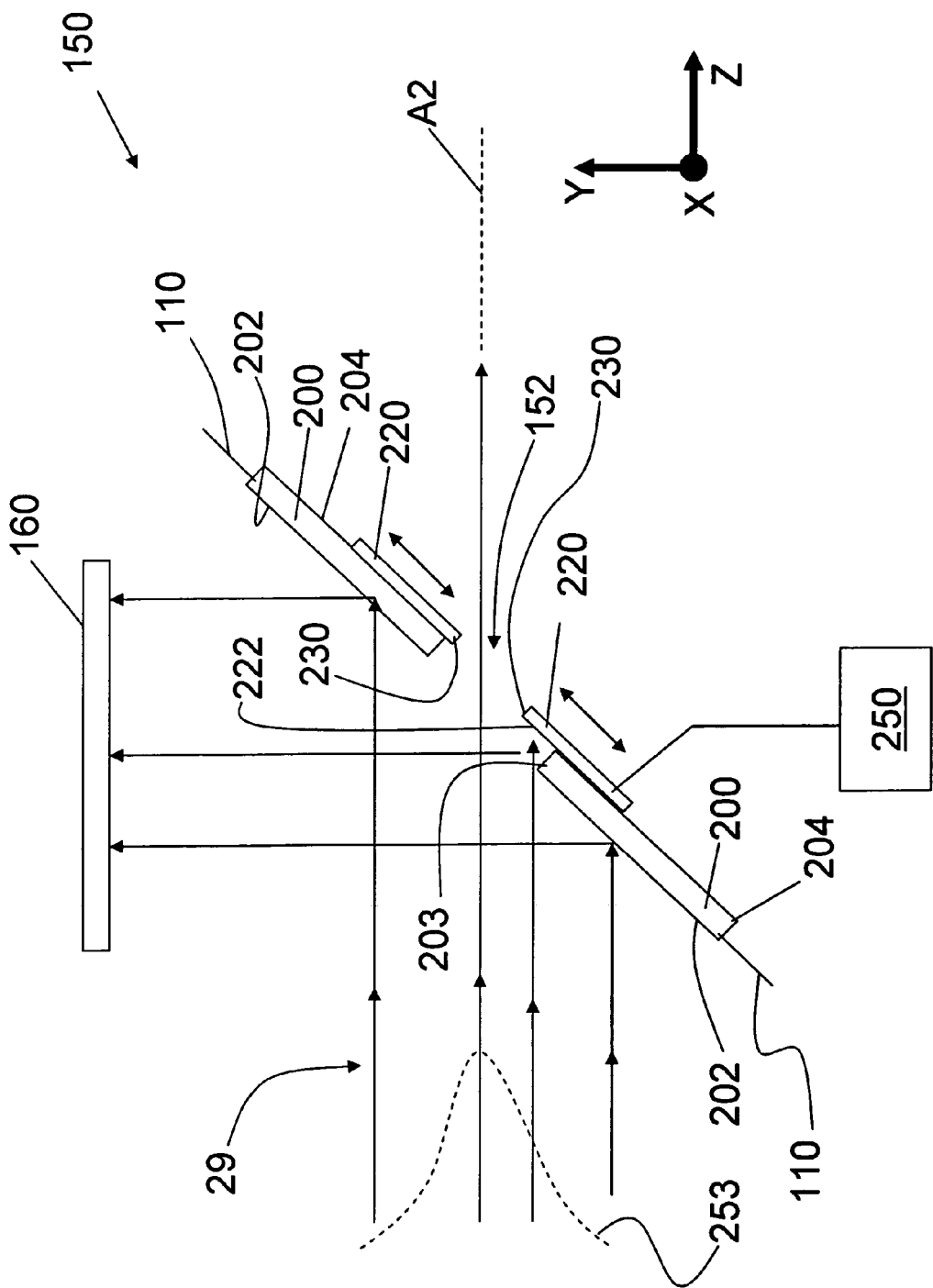
FIG. 7 is a close-up cross-sectional view of an example embodiment of a variable aperture that includes both fixed plates to remove the wings of the Gaussian beam profile and a movable aperture in the form of independently movable blades operably mounted to the fixed plates and that can block varying amounts of the input radiation beam from either one of two opposing directions in order to truncate the image formed at the image plane.

FIG. 7 is a close-up, cross-sectional side view of variable aperture 150 of FIG. 4, along with beam dump 160, and incident radiation beam 29 traveling along optical axis A2. In an example embodiment, aperture 150 includes two fixed plates 200 each having a front surface 202 and an inside edge 203. Plates 200 are arranged in a plane, e.g., aperture plane 110, with their inside edges spaced apart to define opening 152 centered on optical axis A2, and through which part of input radiation beam 29 can pass.

In an example embodiment, aperture 150 also includes a movable aperture 220 having a front surface 222. Movable aperture 220 is arranged, for example, on backside 204 of fixed aperture plate 200. Movable aperture 220 has an aperture defined by inside edges 230 that slide across the fixed aperture to block either the top or bottom edges of input radiation beam 29. In an example embodiment, variable aperture 220 is operably coupled to a controller 250. The use of a movable aperture 220 allows incident radiation beam 29 to be progressively blocked starting from either side of axis A2. This in turn allows image 20 to be partially or completely truncated at image plane 120.

In an example embodiment, moveable aperture 220 includes two independently controlled blades, which extend into opening 152 and form an aperture between them. In another example embodiment, moveable aperture 220 includes a single blade with an opaque portion positioned on either side of the fixed aperture formed by plates 200. This allows either side of the input radiation beam 29 to be progressively truncated.

Figure 2:
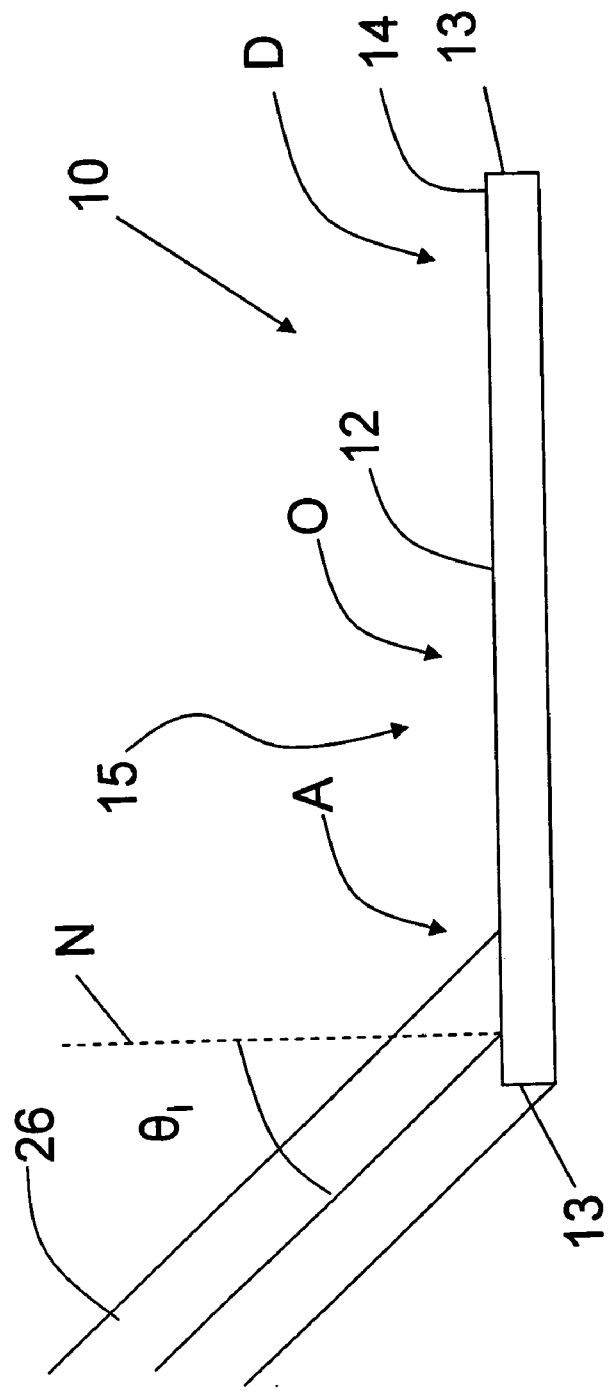
FIG. 2 is a cross-sectional view of the wafer of FIG. 1 taken along the line 2-2, also showing the incident LTP laser beam irradiating the edge of the wafer.
Figure 3:
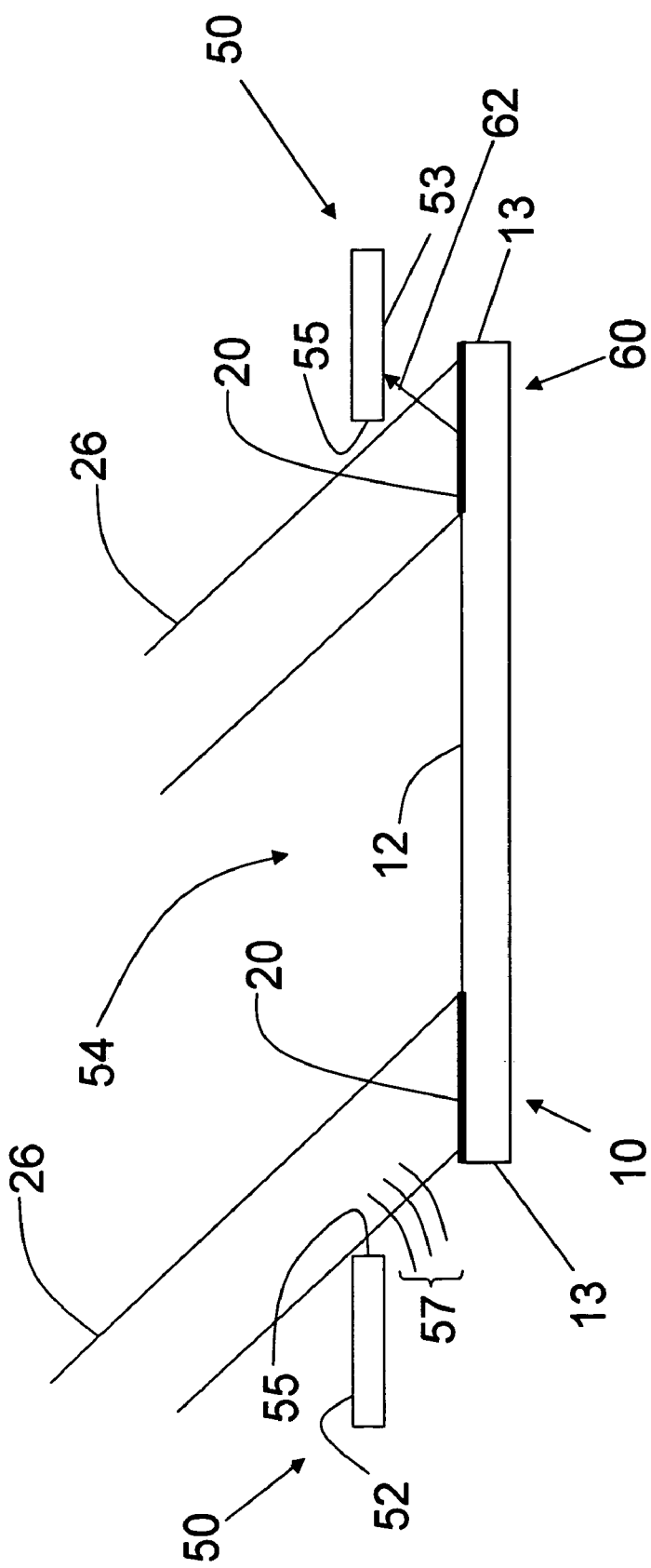
FIG. 3 is a cross-sectional view similar to that of FIG. 2, further including an elevated skirt arranged to block the incident laser beam from irradiating the edge of the wafer, and illustrating the problems with using such a skirt for beam truncation.

In an example embodiment, variable aperture 150 is used to truncate incident radiation beam 29 so that line image 20 formed by LTP laser beam 26 does not irradiate substrate surface 12 at or near wafer edge 13 when the LTP laser beam is being scanned over the wafer surface 12 (FIGS. 1 and 2). In an example embodiment, a blade of movable aperture 220 is moved into the path of radiation beam 29 as line image 20 approaches wafer edge 13. This serves to block the portion of the line image that would otherwise pass over the substrate edge. Thus, the line image length gradually shrinks and then effectively disappears so that the wafer edge is not irradiated with a substantial amount of energy. The peak intensity of the truncated line image goes substantially to zero when the last remaining portion of the truncated line image hits the substrate edge (or alternatively, enters edge exclusion zone 14). Thus, moveable aperture 220 also serves as a shutter so that there is no need to adjust or turnoff the power of incident radiation beam 29 as the image 20 approaches the edge of the wafer during scanning of LTP beam 26 (FIG. 1).

Variable aperture 150 is preferably maintained in tilted aperture plane 110 to keep the aperture in focus across image plane 120. However, the depth of focus of optical relay system 30 is generally so large that the aperture can be tilted at a different angle, such as 45°. This allows the reflected portion of incident radiation beam 29 to be conveniently directed vertically into beam dump 160.

Since variable aperture 150 needs to be placed in the path of a very high-energy incident radiation beam 29, in an example embodiment, plates 200 and movable aperture 220 have highly reflective front surfaces 202 and 222, respectively. In an example embodiment, plates 200 and movable aperture 220 are (or include) highly reflective mirrors.

In an example embodiment, fixed plates 200 are arranged to reduce the power in the outer portion of incident radiation beam 29, i.e., the portion of the laser beam away from optical axis A1. Incident radiation beam 29 will typically have a Gaussian intensity profile, illustrated in FIG. 7 as profile 253, so that the outer portions of the beam removed by the fixed aperture are the wings of the Gaussian profile.

In an example embodiment, plates 200 are preferably water-cooled in order to dissipate the large amount of heat incident upon the plates. The movable aperture 220 is used to vignette the portion of incident radiation beam 29 that corresponds to the portion of line image 20 closest to wafer edge 13. Movable aperture 220 may or may not be water-cooled. In an example embodiment, plates 200 and aperture 220 are made of or include molybdenum.

In an example embodiment, when the LTP laser beam 26 is scanned across the center of the substrate, it is desirable to turn the beam from "full on" to "full off" in the short time duration it takes the beam to cross the narrow exclusion zone 14. Thus, in an example embodiment, where opening 152 is contained in a single blade, it is sized to be significantly larger than the input beam size to allow for fast beam truncation. The extra aperture width allows movable aperture 220 to be accelerated for some time to achieve a reasonable velocity before beam vignetting begins. Similarly, if the movable aperture is a blocking aperture rather than a transmitting aperture, then the blocking aperture can be made oversized.

Pupil Plane Apodization

Figure 8:
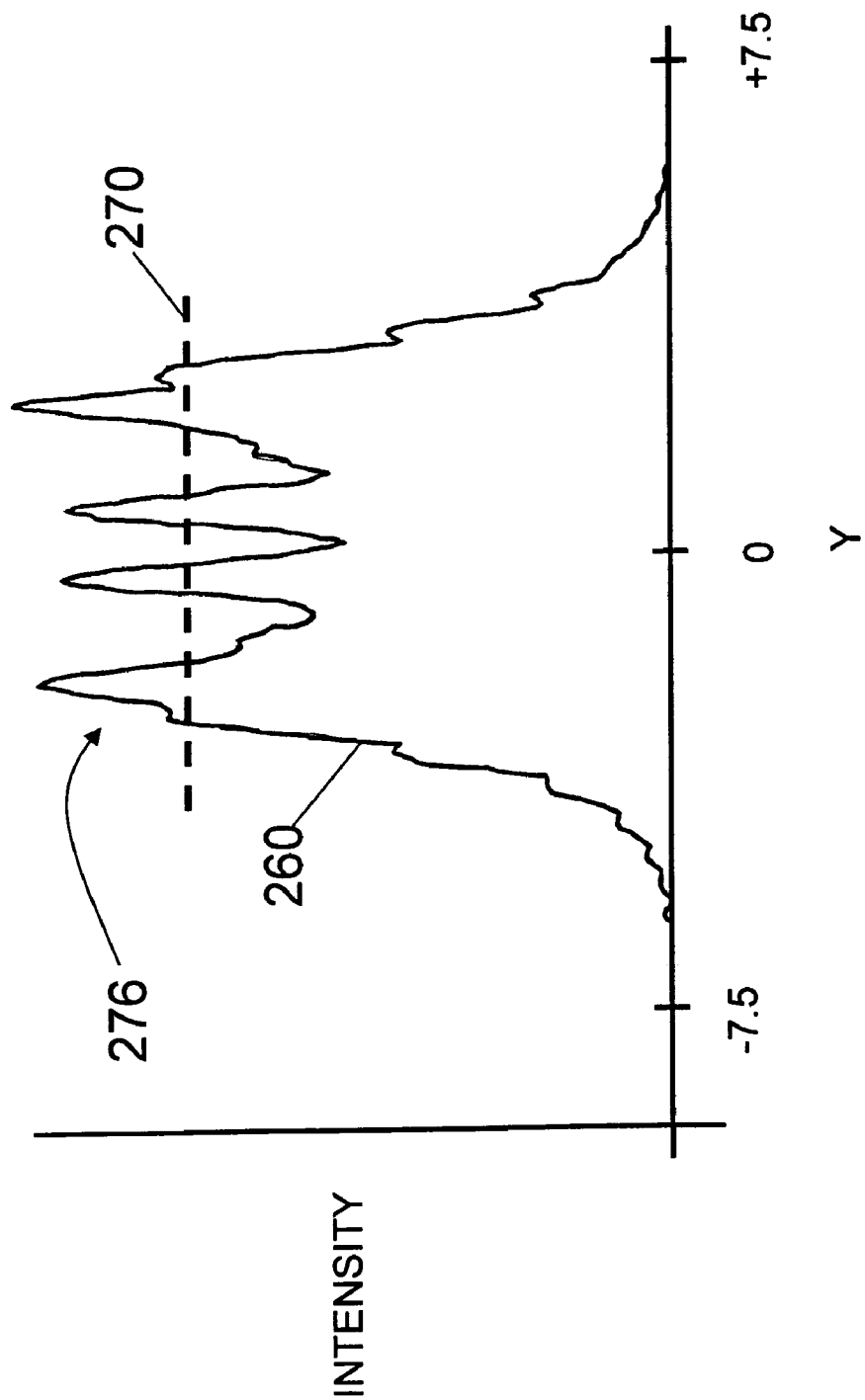
FIG. 8 is a plot of the intensity of a truncated line image taken along the length of the line image when the line image is truncated at both ends by an aperture blocking respective edge portions of the input radiation beam and wherein there is no pupil filtering (apodization)

FIG. 8 is a plot of the intensity profile 260 along line image 20 as a function of position along the length of the image, wherein the line image is truncated by aperture 150 at both ends. Intensity profile 260 is a substantial departure from the smooth Gaussian profile of an untruncated beam. As the plot of FIG. 8 shows, direct truncation of coherent incident radiation beam 29 by aperture 150 causes diffraction, which results in intensity "hot spots" 276 in the truncated image intensity profile 260 as formed at image plane 120. The hot spots 276 have an intensity significantly higher (e.g., greater than 5%) than the intensity maximum 270 of an untruncated line image. While for many applications such hot spots pose no serious problems, there are certain applications, such as LTA, where such hot spots are highly problematic.

Accordingly, in an example embodiment of the invention, the truncation of incident radiation beam 29 using adjustable aperture 150 is combined with the use of apodizing pupil filter 170. The smooth apodization function controls the intensity variation of the truncated image 20 so that it remains substantially uniform. The example embodiments set forth below include several examples of how beam truncation via adjustable aperture 150 upstream of pupil plane 130 combined with pupil apodization can be combined to achieve a substantially uniform image 20 at the image plane 120, over a wide range of beam truncations.

Smoothly Varying Apodization With Central Maximum and Zero Baseline

In an example embodiment, apodizing pupil filter 170 has a smoothly varying transmission with a central maximum. The filter can be either reflective or transmissive, depending on the nature of the optical system.

Figure 9:
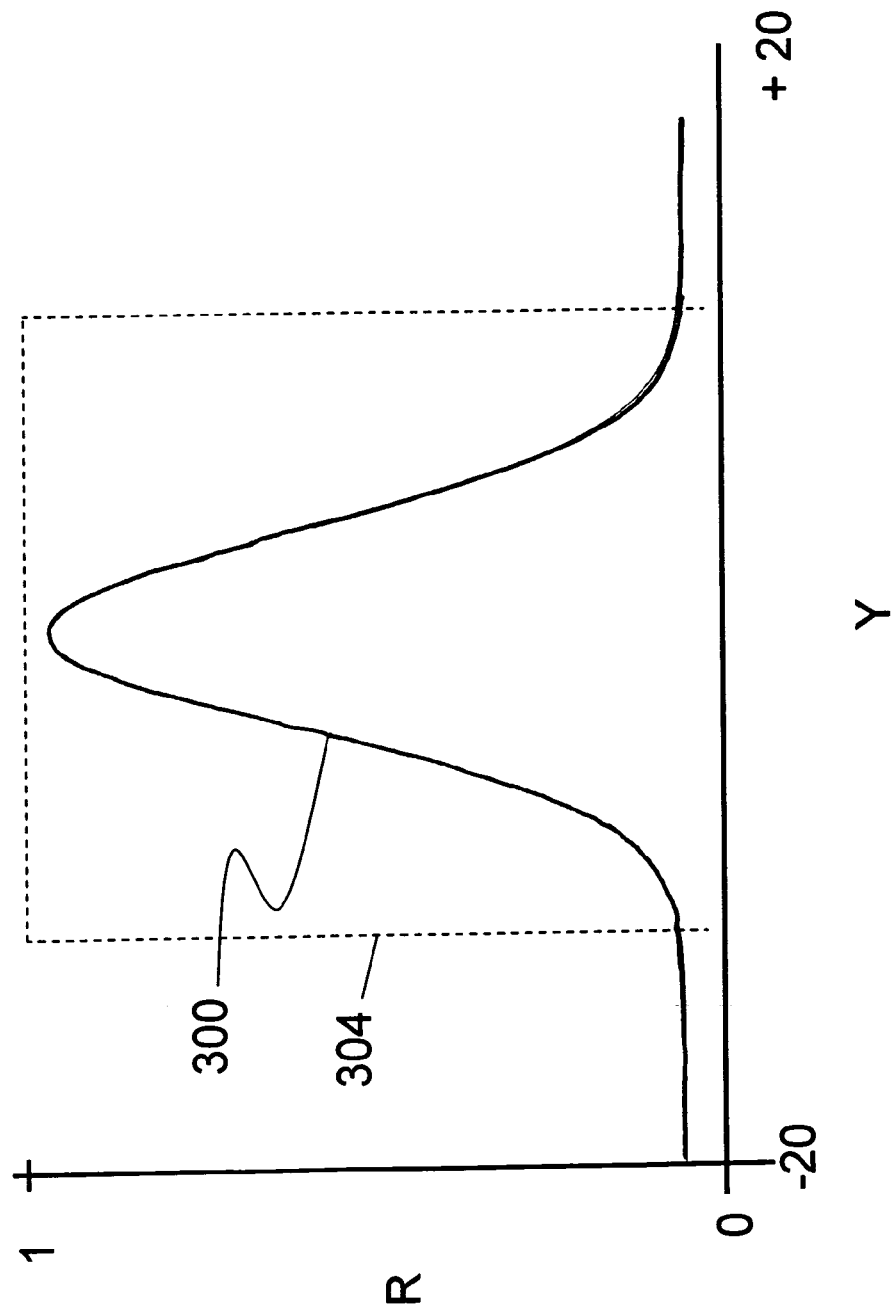
FIG. 9 is a plot of reflectance R vs. distance in the Y-direction for an apodizing pupil filter having a Gaussian profile with a six-percent baseline. An optional binary filter (dashed line) that can be used to provide truly zero transmission in the outer wings of the Gaussian profile is shown superimposed on the Gaussian profile.

FIG. 9 is an example embodiment of an apodization profile 300 for apodizing pupil filter 170, wherein the apodization has a central maximum with a smoothly varying portion surrounding the central maximum. Apodization profile 300 is Gaussian and varies smoothly the Y-direction while being constant in the X-direction. Gaussian profile 300 has a central maximum reflectance of 100% with a baseline of about 6% in the wings of the Gaussian profile. A smooth apodization profile, such as defined by a Gaussian function, is preferred for pupil apodization because it has high transmission/reflection efficiency and does not introduce high spatial frequencies in the image plane.

A Gaussian reflectance profile R(y) sitting on a base $R_{BASE}$ is given by the equation:

$$R(y)=(R_{PEAK}-R_{BASE})\text{EXP}\{-Gy^2\}+R_{BASE}$$

wherein $R_{PEAK}$ and $R_{BASE}$ are the peak and baseline reflectivity values. The parameter G is related to the full width at half maximum (FWHM) of the Gaussian curve, not including the baseline $R_{BASE}$, by the equation, and is given by $G=2.772589/(FWHM)^2$. Note that this FWHM assumes the baseline is zero. In practice, the best value of G is determined by trial and error using a computer model to predict the image intensity profile at the image plane, taking into account various aperture positions and the selected pupil apodization function.

The term "central maximum" in the context of apodizing pupil filter 170 means either a maximum in reflectivity for a reflective apodizing pupil filter or a maximum transmission for a transmissive apodizing pupil filter. There is a substantial difference between the Gaussian apodizing pupil filter profile 300 of FIG. 9, which has a 6% baseline, and a zero-baseline apodization. A baseline above the 2% level generates significant differences, while a baseline less than 2% approximates a zero-baseline apodization. Thus, an apodization with a baseline less than 2% is considered herein to constitute a zero baseline apodization. The distinction between these two types of apodization types (i.e., zero and non-zero baselines) in the context of the present invention is discussed below.

A binary function (filter) 304 can be added to apodizing pupil filter 170 to clip the wings of the Gaussian curve. The effect of this abrupt transition depends on the baseline level where the clipping occurs.

Figure 10:
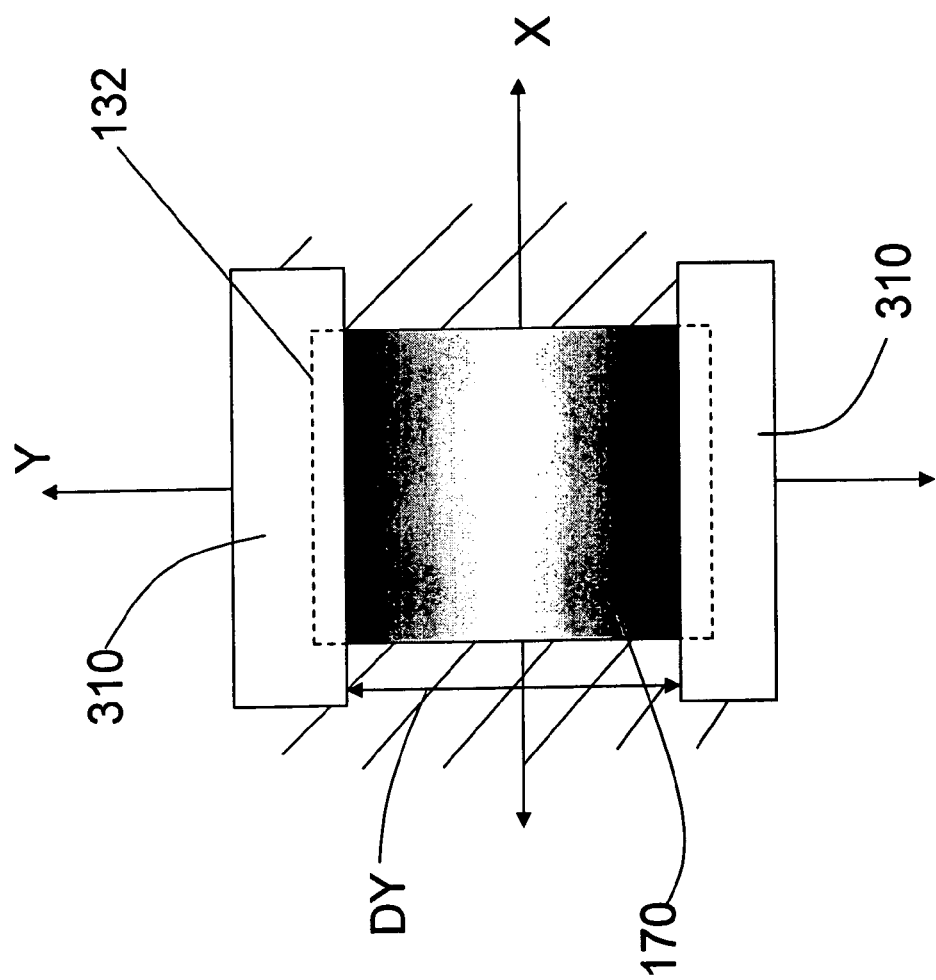
FIG. 10 is a front-on view of an example apodizing pupil filter having a smoothly-varying apodization similar to that illustrated in FIG. 9, wherein the filter includes a set of aperture blades on either side of the X-axis to ensure zero reflection at some aperture width.

FIG. 10 is a front-on view of an example apodizing pupil filter 170 having an apodization function similar to that illustrated in FIG. 9. The apodization profile of apodizing pupil filter 170 is represented in pupil 132 by shading. In an example embodiment, apodizing pupil filter 170 of FIG. 10 includes a set of opposing opaque aperture blades 310 arranged on either side of the X-axis and separated in the Y-direction by a distance DY. The size of pupil 132 is shown as a dashed line behind blades 310 and elsewhere by cross-hatching. Blades 310 ensure that the apodized pupil function hits zero at some predefined point in pupil 132. In an example embodiment, the edges of pupil 132 correspond to the 0.04% points on the intensity distribution.

Radiation diffracted in the Y-direction caused by truncating incident radiation beam 29 with aperture blades 220 is filtered by the smoothly varying pupil apodization in the Y-direction, as indicated by the shading. Radiation that spreads beyond distance DY is completely blocked by optional aperture blades 310.

Figure 11:
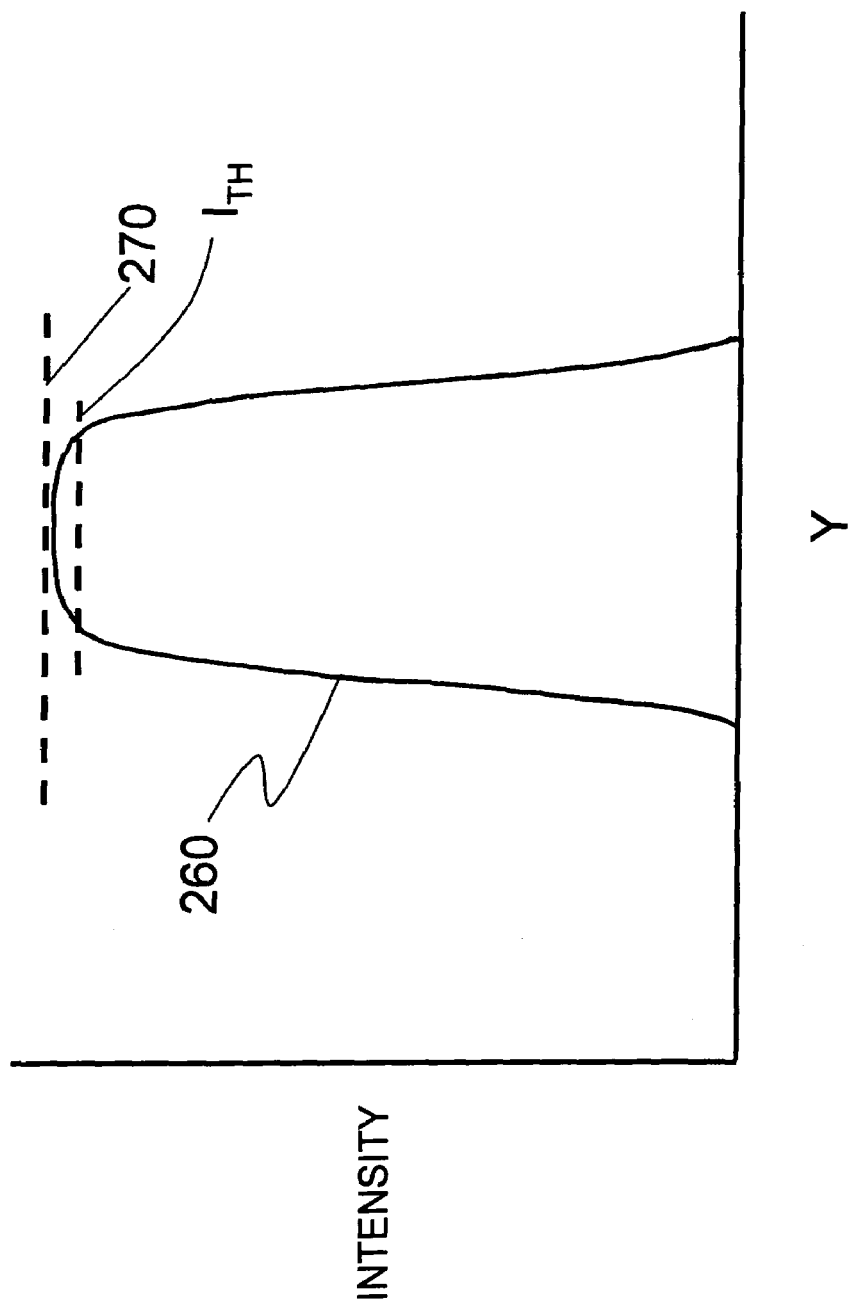
FIG. 11 is a plot similar to that of FIG. 8, with the addition of a zero-baseline Gaussian apodizing pupil filter similar to that of FIG. 9 added to the relay at the pupil plane, illustrating the image formed by that portion of the intensity profile that resides between the maximum intensity and a threshold intensity $I_{th}$.

FIG. 11 is an intensity profile 260 similar to the intensity profile 260 of FIG. 8 formed by the addition of the zero-baseline Gaussian apodizing pupil filter 170 of FIG. 10. The intensity threshold $I_{TH}$, that serves to define the useful portion of intensity profile 260 that constitutes image 20, is also shown for reference. As can be seen in FIG. 11, the combination of a binary aperture 150 in aperture plane 110 and a zero-baseline apodizing pupil filter 170 in a relay pupil plane 110 results in a truncated image 20 with an intensity profile 260 having no hot-spots. Also shown in FIG. 11 is an intensity threshold $I_{TH}$, the intensity above which defines the extent of image 20. In an example embodiment, $I_{TH}$ is 96% of the maximum intensity of profile 260. In a more critical application $I_{TH}$ might be 99%.

Figure 12:
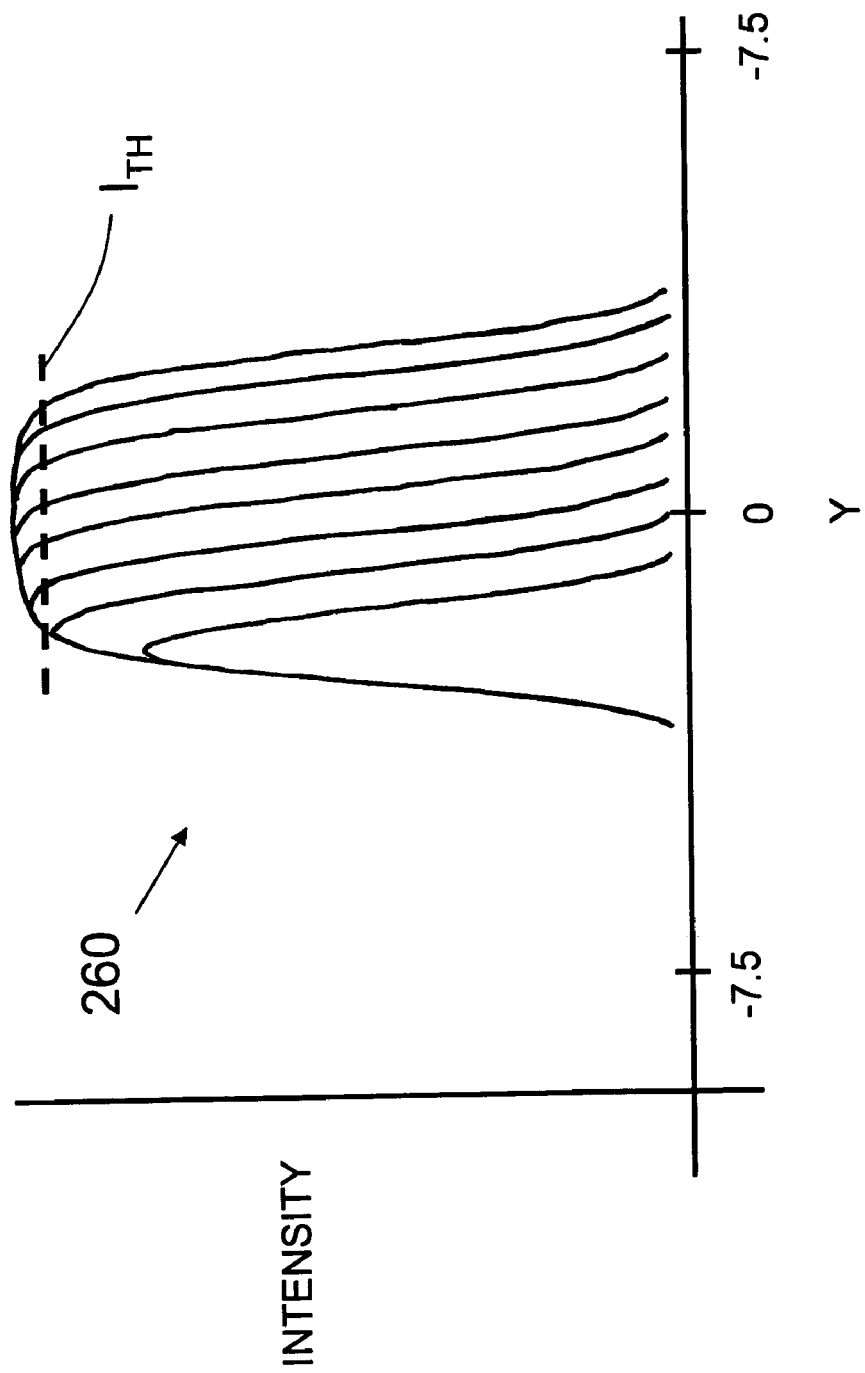
FIG. 12 is a series of plots similar to that shown in FIG. 11, for varying degrees of image truncation, with the left-most profile corresponding to the greatest degree of truncation, as formed with a binary variable aperture and a zero-baseline Gaussian apodizing pupil filter similar to that of FIG. 9.

FIG. 12 is a series of truncated intensity profiles 260 of a truncated image 20 formed at image plane 120 (FIG. 4) using as an example a two percent-baseline Gaussian apodization similar to the 6% baseline Gaussian apodization of FIG. 9. The intensity threshold $I_{TH}$ is shown for reference. The truncated images 20 as viewed from right to left correspond to movable aperture 220 of aperture 150 (having an unobstructed opening 152 of 7.64 mm) moving inwardly in steps of 0.71 mm from one side of the opening toward the other to close off the opening. The third left-most intensity profile corresponds to when aperture 150 blocks about 50% of the opening 152, while the right-most curve represents the original "untruncated image". It should be noted that even the so-called "untruncated image" may still, strictly speaking, constitute a "truncated" image in the case where plates 200 serve to truncate the Gaussian wings of incident radiation beam 29.

The intensity profiles 260 in FIG. 12 remain substantially uniform during the image truncation process, with the exception of the left-most profile. Note, however, that the images 20 associated with the two left-most image profiles 260 can be considered to have disappeared, i.e. to have no useful image length. This is because the maxima for these image profiles fall below the threshold intensity $I_{TH}$. The intensity maxima for all of the other truncated image profiles 260 remain at or below the maximum intensity of the untruncated image associated with the fixed-aperture beam profile (the right-most profile)—i.e., there is no substantial intensity overshoot caused by the image truncation. This is one of the advantages of the present invention. In this example embodiment, the energy in input radiation beam 29 does not need to be adjusted just to keep the maximum energy level (intensity) at wafer 10 constant or within a small overshoot tolerance as the beam is being truncated. This is because in all cases the maximum intensity of the truncated image does not exceed the maximum intensity of the untruncated image.

In an alternative example embodiment, the present invention provides a substantially uniform image, with, in some truncation cases, the maximum intensity exceeding the maximum of the untruncated case. In this case, the energy (intensity) of input radiation beam 29 from the laser source (e.g., laser source 28 of FIG. 1) is reduced to compensate for the overshoot. This yields truncated images that are uniform and that have substantially the same maximum intensity as the untruncated image.

Smoothly Varying Apodization With Non-zero Baseline

Computer modeling shows that the imaging results using a smoothly varying apodization with a non-zero baseline are not always as favorable as those obtained with a smoothly varying apodization with a zero-baseline. With a non-zero baseline, computer modeling indicates that the intensity maxima of the truncated images tend to overshoot the untruncated intensity maximum. Computer modeling also shows that reducing the width of binary pupil filter 304 to cut off more of the wings of the pupil Gaussian apodization to force a zero-baseline can also result in significant overshoot. This is simply a consequence of the sharp intensity discontinuity produced by the binary filter. However, it may prove to be impractical (or at least very expensive) to construct a reflective Gaussian filter with a very small base offset such as shown in FIG. 9. Also, it may prove to be undesirable to have to reduce the output power of the laser (not shown) that generates input radiation beam 29 to account for the truncated image intensity overshoot. Accordingly, it is useful to have an alternative approach, which avoids these difficulties with image truncation.

Figure 13:
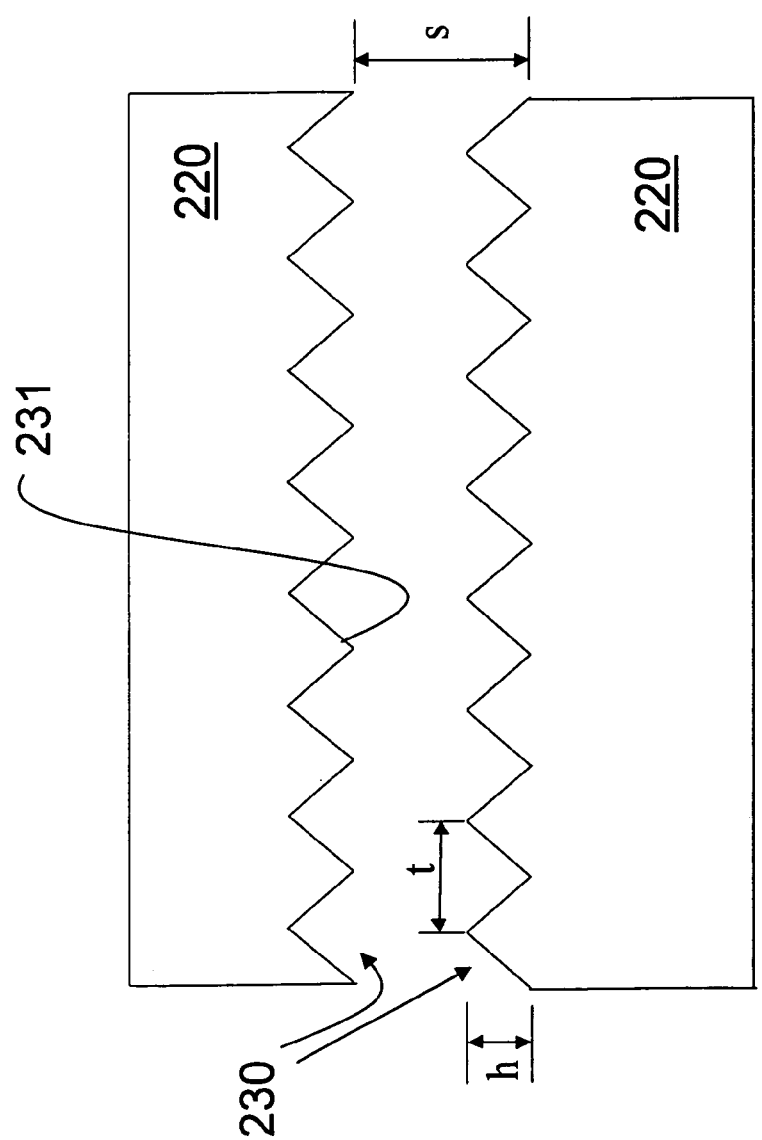
FIG. 13 is a face-on view of an example embodiment of the movable portion of the variable aperture, wherein the aperture has serrated edges.
Figure 14:
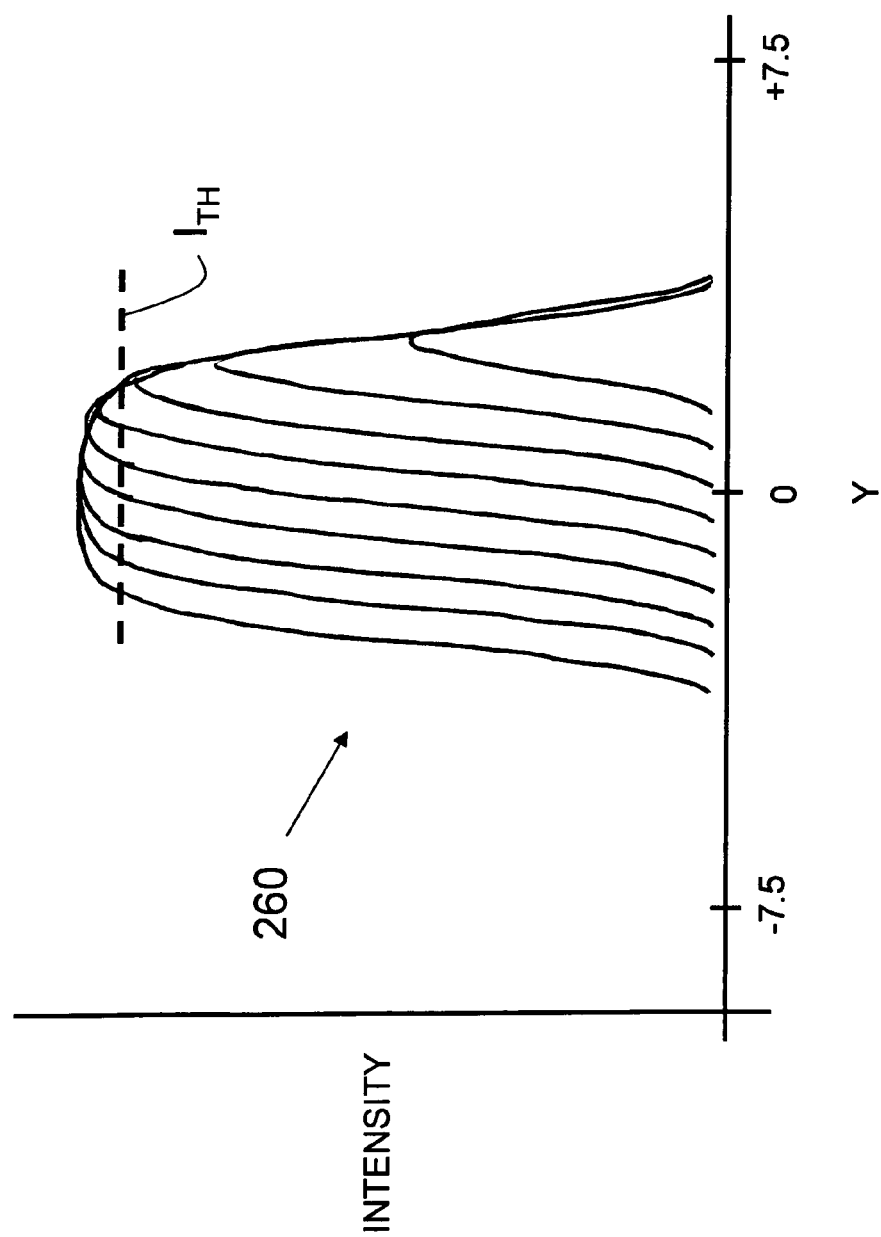
FIG. 14 is similar to FIG. 12, but wherein the optical system includes a serrated variable aperture like that shown in FIG. 12, and a 6%-baseline Gaussian apodizing pupil filter, with the right-most profile corresponding to the greatest degree of truncation.

FIG. 13 is a close-up view of an example embodiment of movable aperture 220 of aperture 150, wherein aperture edges 230 include serrations 231. FIG. 14 illustrates a series of intensity profiles 260 corresponding to truncated images 20 formed using a combination of a serrated aperture 150 in aperture plane 110 and a 6%-baseline Gaussian apodizing pupil filter 170. As one of the edges 230 moves to constrict aperture opening 152, (FIG. 7), the maximum intensity of each truncated image 20 remains close to the maximum intensity of the untruncated image (the left-most profile in FIG. 14). Thus, the truncated images remain substantially uniform before they disappear (the three right-most profiles are below intensity threshold $I_{TH}$).

Computer modeling indicates that different amounts of intensity overshoot can occur, depending on the exact apodization profile of apodizing pupil filter 170 arranged at pupil 132, and type of serrations used in the aperture plane. However, parameters that yield an overshoot of less than the proposed 4% overshoot tolerance are readily found. For a specific embodiment, empirical analysis and/or computer modeling may be used to determine the optimum parameters for apodizing pupil filter 170 and serrations 231 for movable aperture 220.

The operating principle behind serrations 231 of movable aperture 220 is that the projected size of the individual serrations onto the plane normal to the optical axis are about the same size as the spacing between the peaks in the diffraction pattern produced by an equivalent single straight edge. This averages out the ripples generated by diffraction and results in a relatively smooth intensity distribution in the resultant truncated image profiles.

Computer modeling shows that the height "h" of individual serrations 231 is the critical parameter for mitigating diffraction. For a given serration height "h", the spatial frequency "f" (f=1/t, where t is the serration period) of the serrations is of secondary importance. In an example embodiment, serration heights "h" of about 1 mm as projected onto a plane normal to axis A2 are used. This translates into using a height "h" of about 1.4 mm when aperture 150 is tilted at 45° relative to axis A2.

An example of a choice of parameters for a serrated-edge aperture oriented at 45° relative to axis A2 for an imaging system operating a wavelength of 10.6 microns is:

edge separation s=7.071 mm
serration period t=0.5 mm
serration height h=1.414 mm.
line image length FWHM=55 mm
line image width FWHM=0.1 mm
Gaussian apodizer length (profile direction)=25 mm
Gaussian apodizer width=50 mm

Displaced Aperture Location

Figure 15:
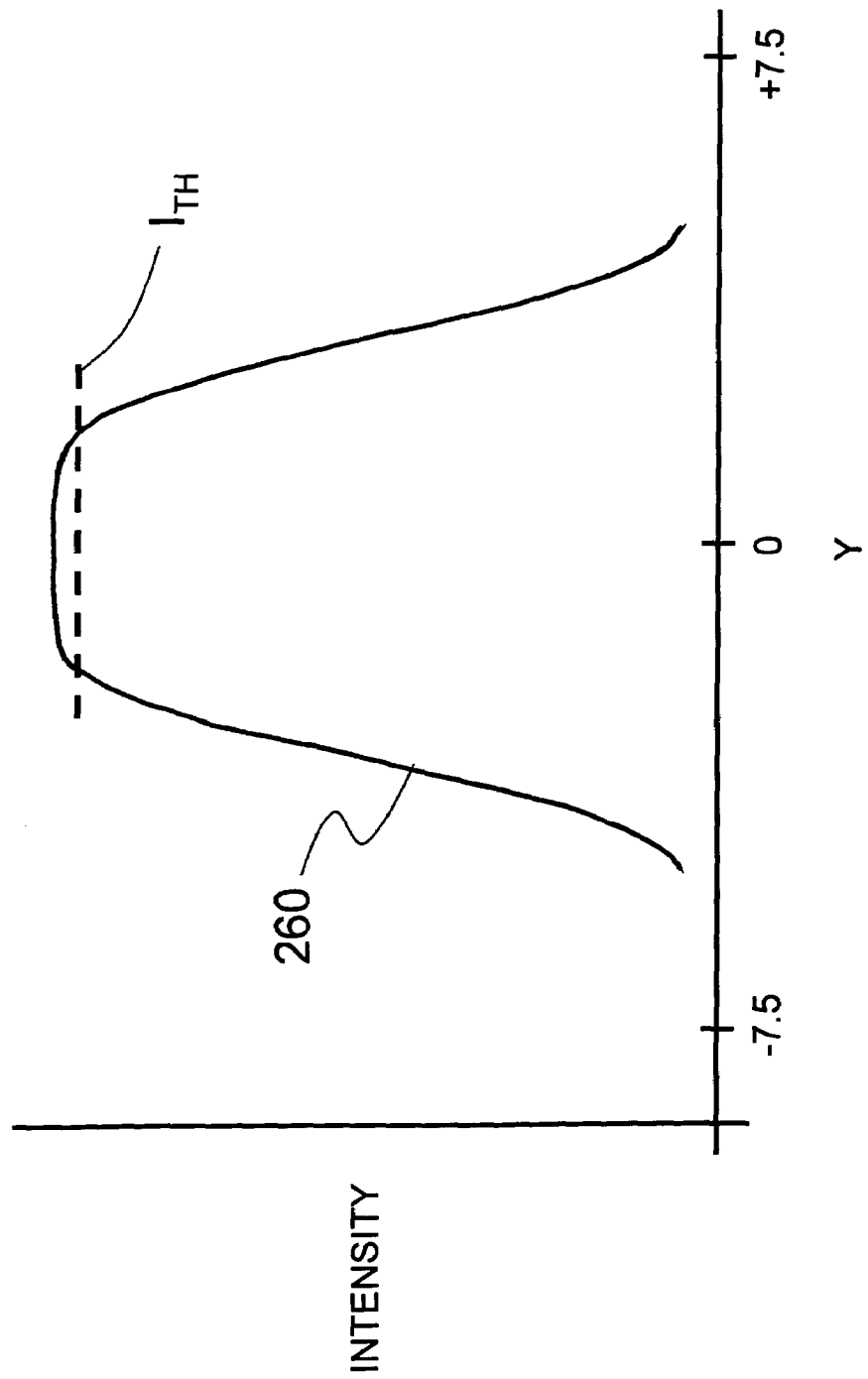
FIG. 15 is a plot similar to that of FIGS. 8 and 11, wherein the variable aperture has straight edges positioned well outside of the depth of focus of the aperture plane.

In an example embodiment, aperture 150 is arranged at a location other than at its usual conjugate position associated with aperture conjugate plane 110. FIG. 15 is a intensity profile 260 of a line image 20 formed using a zero-baseline Gaussian apodizing pupil filter 170 and an aperture 150 with movable aperture 220 fully open so that the incident radiation beam 29 sees the straight inside edges 203 of fixed aperture plates 200. The profile 260 of FIG. 15 was formed with aperture 150 moved away from best focus and closer to the apodizing pupil filter 170 by a distance larger than the depth of field at the aperture plane. The interesting feature of the intensity profile 260 illustrated in FIG. 15 is the flat profile of the curve near the maximum intensity. This is much flatter than would be expected from a Gaussian profile.

If the intensity threshold $I_{TH}$ is 99% of the peak intensity of profile 260 of FIG. 15, then the useful image length is increased by more than 30% as compared with the image profile formed when aperture 150 is located at conjugate plane 110 (or within its depth of field). However, the slopes of the "defocused" intensity profile 260 of FIG. 15 have more gradually rising sidewalls than an "in focus" profile, so that the image is not as sharp as the in-focus image.

Figure 16:
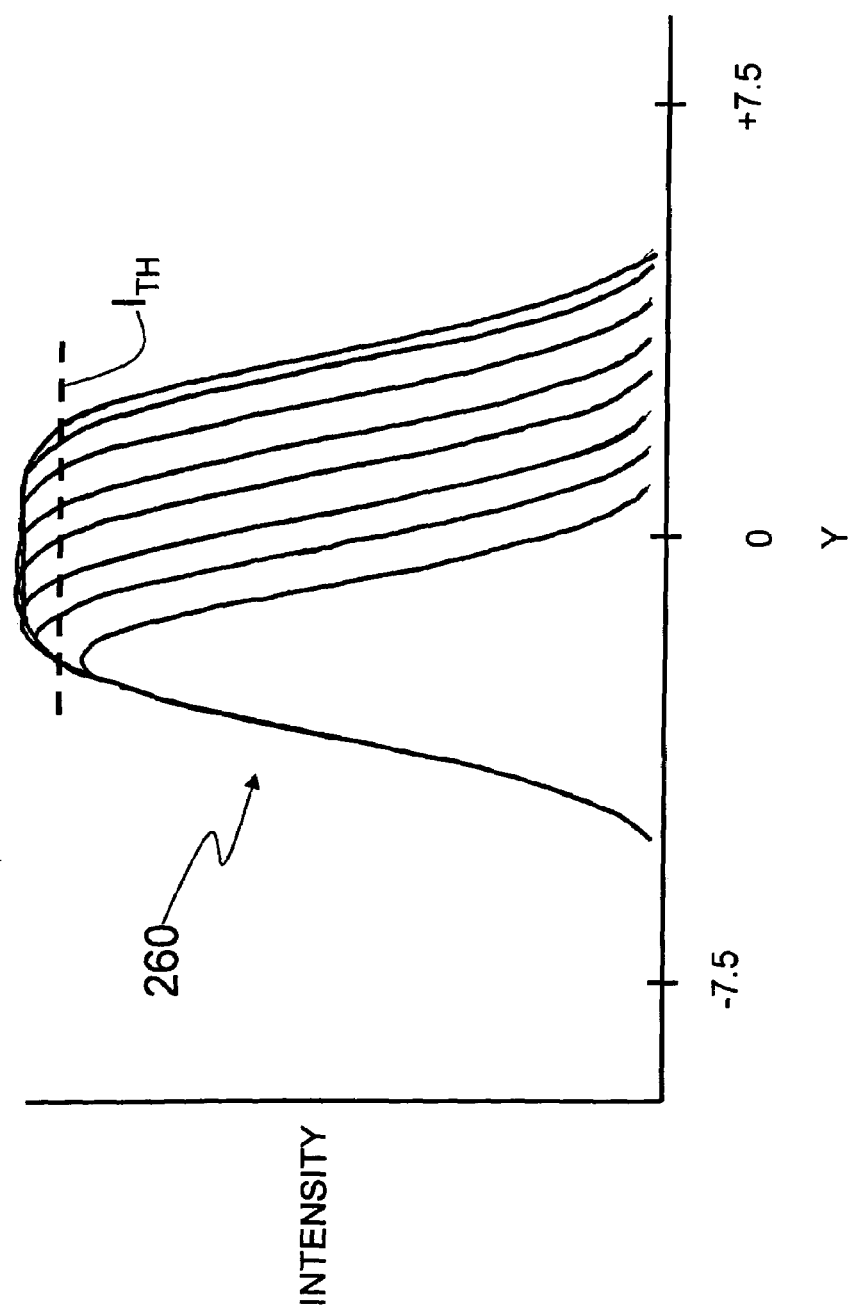
FIG. 16 is similar to FIG. 12, wherein the image profiles were formed using the defocused aperture and a zero-baseline Gaussian apodizing pupil filter similar to that of FIG. 9.

FIG. 16 illustrates a series of intensity profiles 260 of image 20, similar to the series of FIG. 14, with a zero-baseline Gaussian apodization for apodizing pupil filter 170 and taken as a flat edge 230 of movable aperture 220 cuts off incident radiation beam 29 at the displaced location of the aperture. Only about a 1% overshoot in intensity is observed in this case.

FIG. 17 is a plan view of a substrate showing the upper surface with the product zone and the exclusion zone. A series of line images 20 is shown, with the bottom-most line image representing an untruncated line image. The line images are shown at different positions along the scan path in a scan direction indicated by arrow 33. As line image 20 moves in the scan direction, the left side of the image will enter exclusion zone 14 and then strike edge 13 if it is not truncated. Accordingly, in an example embodiment, line image 20 (starting with the bottom-most line image) is progressively truncated as it moves in the scan direction so that only product zone 15 is irradiated at maximum intensity. As the line image progresses along the scan path, it is progressively truncated from the left so that the intensity is attenuated in edge exclusion zone 14. Finally, as illustrated by the top-most line image 20, the truncation has caused the line image to all but disappear.

As described above, during the progressive truncation, line image 20 is maintained uniform in product zone 15. Maintaining the image uniformity during truncation permits scanning near the boundary of the wafer with the requisite uniformity in the product zone without the aforementioned risks posed by wafer edge irradiation.

APPENDICES A AND B—EXAMPLE OPTICAL RELAY SYSTEM PRESCRIPTIONS

APPENDIX A

Two Mirror Relay Optical System Prescription

|  | RDY | THI | RMD | GLA |
|---|---|---|---|---|
| OBJ: | INFINITY | INFINITY | | |
| STO: | INFINITY | 500 | | |
| 2: | INFINITY | 1500 | | |
| DAR | | | | |
| ADE: | −75 | | | |
| 3: | | −3000 | −1500 | REFL |
| YTO: | | | | |
| RDX: | INFINITY | | | |
| K: | −1 | | | |
| YDE: | −200 | | | |
| 4: | INFINITY | −1500 | | |
| 5: | | 3000 | 1500 | REFL |
| YTO: | | | | |
| RDX: | INFINITY | | | |
| K: | −1 | | | |
| 6: | | INFINITY | −790.162895 | |
| 7: | | INFINITY | −140 | REFL |
| YDE: | −200 | | | |
| BEN | | | | |
| ADE: | 45 | | | |
| 8: | | INFINITY | 0 | REFL |
| ADE: | −37.5 | | | |
| 9: | | INFINITY | 90 | |
| 10: | | INFINITY | −80 | REFL |
| XTO: | | | | |
| RDX: | −160 | | | |
| K: | 0 | | | |
| YDE: | −335.9 | | | |
| IMG: | | INFINITY | 0 | |
| YDE: | −300 | | DAR | |

SPECIFICATION DATA

| EPD | 48.55764 |
|---|---|
| DIM | MM |
| WL | 10600.00 |
| REF | 1 |
| WTW | 1 |
| XAN | 0 |
| YAN | 0 |
| WTF | 1 |
| VUX | 0 |
| VLX | 0 |
| VUY | 0 |
| VLY | 0 |
| PFR | 1 |
| PTP | 0 |
| POR | 0 |
| PRO | LIN |

INFINITE CONJUGATES

| EFL | −0.1E+19 |
|---|---|
| BFL | −0.1E+19 |
| FFL | 0.1E+19 |
| FNO | 0.2059E+17 |

AT USED CONJUGATES

| RED | −0.1E+08 |
|---|---|
| FNO | −0.2059E+17 |
| OBJ DIS | 0.1E+12 |
| TT | 0.1E+12 |
| IMG DIS | −80 |
| OAL | −340.1629 |

PARAXIAL IMAGE

| HT | 0 |
|---|---|
| THI | −0.1E+19 |
| ANG | 0 |

ENTRANCE PUPIL

| DIA | 48.5576 |
|---|---|
| THI | 0 |

EXIT PUPIL

| DIA | 48.5576 |
|---|---|
| THI | −60.1629 |

APPENDIX B

Three Mirror Five Reflection Relay Optical System Prescription

|  |  | RDY | THI | RMD | GLA |
|---|---|---|---|---|---|
| OBJ: |  | INFINITY | INFINITY |  |  |
| STO: |  | INFINITY | 500 |  |  |
| 2: |  | INFINITY | 1500 |  |  |
| 3: |  | INFINITY | 362 |  |  |
| 4: |  | −1267.40273 | −362 | REFL |  |
|  | YTO: |  |  |  |  |
|  | RDX: | INFINITY |  |  |  |
|  | YDE: | −147.8 |  |  |  |
| 5: |  | −1196.47669 | 490 | REFL |  |
|  | YTO: |  |  |  |  |
|  | RDX: | INFINITY |  |  |  |
| 6: |  | INFINITY | −490 | REFL |  |
| 7: |  | −1196.47669 | 362 | REFL |  |
|  | YTO: |  |  |  |  |
|  | RDX: | INFINITY |  |  |  |
| 8: |  | −1267.40273 | −362 | REFL |  |
|  | YTO: |  |  |  |  |
|  | RDX: | INFINITY |  |  |  |
| 9: |  | INFINITY | −593.170411 |  |  |
|  | YDE: | −147.8 |  |  |  |
| 10: |  | INFINITY | 250 | REFL |  |
|  | BEN |  |  |  |  |
|  | ADE: | −45 |  |  |  |
| 11: |  | INFINITY | 0 | REFL |  |
|  | DAR |  |  |  |  |
|  | ADE: | −37.5 |  |  |  |
| 12: |  | INFINITY | −90 |  |  |
| 13: |  | INFINITY | 80 | REFL |  |
|  | XTO: |  |  |  |  |
|  | RDX: | 160 |  |  |  |
|  | YDE: | 335.879185 |  |  |  |
| IMG: |  | INFINITY | 0 |  |  |

SPECIFICATION DATA

| EPD | 48.55764 |
|---|---|
| DIM | MM |
| WL | 10600 |
| REF | 1 |
| WTW | 1 |
| XAN | 0 |
| YAN | 0 |
| WTF | 1 |
| VUX | 0 |
| VLX | 0 |
| VUY | 0 |
| VLY | 0 |
| PFR | 1 |
| PTP | 0 |
| POR | 0 |
| PRO | LIN |

|  | POS 1 | POS 2 | POS 3 |
|---|---|---|---|
| ZOOM DATA |  |  |  |
| ADE S11 | −37.5 | −36.25 | −38.75 |
| INFINITE CONJUGATES |  |  |  |
| EFL | 86672.9040 | 86672.9040 | 86672.9040 |
| BFL | −86104.5661 | −86104.5661 | −86104.5661 |
| FFL | 87171.3957 | 87171.3957 | 87171.3957 |
| FNO | 1784.9487 | 1784.9487 | 1784.9487 |
| IMG DIS | 80 | 80 | 80 |
| OAL | 1566.8296 | 1566.8296 | 1566.8296 |

APPENDIX B-continued

Three Mirror Five Reflection Relay Optical System Prescription

| PARAXIAL IMAGE |  |  |  |
|---|---|---|---|
| HT | 0 | 0 | 0 |
| ANG | 0 | 0 | 0 |
| ENTRANCE PUPIL |  |  |  |
| DIA | 48.5576 | 48.5576 | 48.5576 |
| THI | 0 | 0 | 0 |
| EXIT PUPIL |  |  |  |
| DIA | 48.2800 | 48.2800 | 48.2800 |
| THI | 72.6967 | 72.6967 | 72.6967 |
| STO DIA | 48.5576 | 48.5576 | 48.5576 |

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction and operation described herein. Accordingly, other embodiments are within the scope of the appended claims.

What is claimed is:

1. An optical apparatus for truncating a line image formed with coherent radiation, comprising an optical relay system having an aperture plane, a pupil plane, and an image plane, in that order, with the aperture plane conjugate to the image plane, the optical relay system disposed to receive an incident beam of coherent radiation at the aperture plane and to form from said beam of coherent radiation an untruncated line image having first and second ends, a length and a maximum intensity in said image plane, the optical relay system additionally having an apodizing pupil filter arranged at the pupil plane and a variable aperture arranged in the aperture plane and adapted to progressively truncate the incident radiation beam to progressively truncate the line image from the first and/or second end wherein the apodizing pupil filter acts to reduce diffraction of the beam from the variable aperture during truncation of the image so that the truncated image has a maximum intensity substantially equal to or less than the untruncated image maximum intensity.

2. The apparatus of claim 1, wherein the optical relay system further includes an afocal optical relay in association with the pupil plane and an imaging optical system between the pupil plane and the image plane with the imaging optical system only having optical power in a direction corresponding to the width of the line-image.

3. The apparatus of claim 2, wherein the afocal optical system is a reflective optical system.

4. The apparatus of claim 1, wherein the optical relay system includes an afocal optical relay in association with the pupil plane and an imaging optical system between the pupil plane and the image plane with, wherein the afocal optical relay has optical power in a single direction corresponding to the length of the line-image.

5. The apparatus of claim 4, wherein the afocal optical relay is a reflective optical system.

6. The apparatus of claim 1, wherein the apodizing pupil filter has a central maximum transmission with a smoothly decreasing transmission away from the central maximum.

7. The apparatus of claim 1, wherein the variable aperture includes:
a fixed central opening through which the incident radiation beam passes; and
a movable aperture adapted to progressively block varying amounts of the central opening from at least one of two opposing directions to be able to truncate one end or the other of the line-image in the image plane on a surface of a substrate.

8. The apparatus of claim 1, where at least a portion of the variable aperture is made of molybdenum.

9. The apparatus of claim 1, wherein the apodizing pupil filter includes a Gaussian apodization function with a zero baseline.

10. The apparatus of claim 1, wherein the image has a long direction, the pupil plane includes a pupil with a pupil size, and wherein the apodizing pupil filter includes a binary apodization function that limits the pupil size in a direction corresponding to the long direction of the image.

11. The apparatus of claim 1, wherein the apodizing pupil filter has a Gaussian transmission or reflection profile in a direction corresponding to the length of the image.

12. The apparatus of claim 11, wherein the apodizing pupil filter has a zero baseline.

13. An optical apparatus for truncating an image scanned over a substrate having a surface that includes a product zone surrounded by an edge exclusion zone, comprising an optical relay system adapted to receive a beam of coherent radiation and form therefrom a uniform image that is scanned over the substrate surface, the optical relay system having a variable aperture adapted to selectively block some or all of the beam of coherent radiation to progressively truncate the image as the scanned image transitions from the product zone to the exclusion zone or vice versa and an apodizing pupil filter arranged at a pupil plane between the variable aperture and the substrate adapted to reduce diffraction of the beam from the variable aperture during image truncation so that the truncated image on the surface of the substrate remains uniform.

14. The apparatus of claim 13, wherein the truncated image uniformity is maintained to within 4% or less of a maximum image intensity.

15. The apparatus of claim 13, wherein the variable aperture includes opposing and independently movable blades adapted to be inserted into the input coherent radiation beam.

16. The apparatus of claim 13, wherein the variable aperture includes molybdenum.

17. The apparatus of claim 13, wherein the variable aperture includes blades having respective opposing serrated edges.

18. The apparatus of claim 13, wherein the apodizing pupil filter has a transmissivity or reflectivity profile having a central maximum and an attenuation that increases away from the central maximum.

19. The apparatus of claim 18, wherein the profile of the apodizing filter follows a Gaussian function.

20. The apparatus of 18, wherein the apodizing filter has an apodization that has a zero baseline.

21. The apparatus of claim 13, wherein the image is a line image.

22. The apparatus of claim 21, wherein the pupil plane includes a pupil having a size, and wherein the apodizing pupil filter includes a binary apodization that limits the pupil size in a direction corresponding to a long direction of the line image.

23. The apparatus of claim 21 where the optical relay system also includes an anamorphic optical relay having optical power in a direction corresponding to the length of the line-image.

24. The apparatus of claim 23, further including an anamorphic imaging optical system optically coupled to the anamorphic optical relay and having optical power in a direction at right angles to the length of the line-image.

25. A method of progressively truncating an image formed at an image plane of an optical relay system having a pupil plane, comprising:
progressively blocking a portion of the coherent radiation upstream of the pupil plane; and
forming a uniform truncated image by apodizing the pupil plane to reduce diffraction effects caused by progressively blocking the portion of the radiation.

26. The method of claim 25, wherein said progressive blocking includes:
sending the coherent radiation through a variable aperture; and
continuously reducing the variable aperture.

27. The method of claim 25, wherein the image is a line image having a length, and wherein reducing the size of the image includes reducing the image length.

28. The method of claim 25, wherein the blocking includes introducing one or more blade edges into the coherent radiation.

29. The method of claim 28 wherein said one or more blade edges includes serrations.

30. The method of claim 25, wherein said blocking occurs at or near an aperture plane conjugate to the image plane.

31. The method of claim 25, further including coordinating the the step of progressively blocking with a position of the image on a substrate to prevent the image from being incident on an edge of the substrate.

32. The method of claim 31, wherein the substrate includes a product zone surrounded by an edge exclusion zone, and said coordinating controls the step of progressively blocking to allow the image to be incident on the product zone but not incident on the exclusion zone.

33. The method of claim 25, wherein the image has a long direction, and wherein said apodizing the pupil plane includes providing a smoothly varying reflective or transmissive apodization that has a central maximum and a corresponding reflectivity or attenuation that increases away from the center in a direction corresponding to the long direction of the image.

34. A method of performing laser thermal annealing of a substrate having an outer edge and an upper surface having a product zone and an edge exclusion zone surrounding the product zone, comprising:
forming, from a beam of coherent radiation, a uniform line image with first and second ends at an image plane substantially coincident with the upper surface of the substrate;
scanning the line image over the upper surface of the substrate; and
truncating the line image, while the line imaging is scanning, at the first and/or second end to form a uniform truncated line image that does not substantially irradiate the outer edge of the substrate.

35. The method of claim 34, wherein the untruncated line image has a maximum intensity, and the truncating step truncates the first and/or second end of the line image as it passes from the product zone to the edge exclusion zone to maintain the truncated image in the product zone at substantially the maximum line image intensity.

36. The method of claim 34, wherein forming the line image includes passing the coherent radiation beam through an optical relay system.

37. The method of claim 36, wherein passing the coherent radiation beam through an optical relay system includes passing the coherent radiation first through an afocal optical relay and then through an imaging optical system.

38. The method of claim 36, further includes apodizing a pupil plane of the optical relay system with a smoothly varying reflective or transmissive apodization function having a central maximum and a corresponding attenuation or reflectivity that increases away from the center in a direction corresponding to a long direction of the image.

39. The method of claim 38, wherein said apodiziation function asymptotically approaches zero reflection or transmission at the pupil edge.

40. The method of claim 36, wherein the optical relay system has an aperture plane conjugate to an image plane, and wherein said truncating includes blocking a portion of the coherent radiation beam at the aperture plane.

41. The method of claim 34, wherein the truncating is performed so that the exclusion zone is not substantially irradiated.

42. A method of performing laser thermal annealing of a substrate having an outer edge and an upper surface having a product zone and an edge exclusion zone surrounding the product zone, comprising:

forming, from a beam of coherent radiation, a line image at an image plane substantially coincident with the upper surface of the substrate, the line image having a degree of uniformity;

scanning the line image over the upper surface of the substrate by butting adjacent line scans so that a minimum intensity seen by any point on the product zone is equal or greater than a threshold intensity value; and truncating the line image, while the line image is scanning, so that the wafer outer edge is not substantially irradiated while maintaining the truncated line image in the product zone at said degree of uniformity.

43. The method of claim 41, wherein the truncating includes preventing the edge exclusion zone from being substantially irradiated so that only the product zone is irradiated at a level above a select intensity threshold.

* * * * *